United States Patent
Kachi

(10) Patent No.: US 9,882,226 B2
(45) Date of Patent: Jan. 30, 2018

(54) FUEL CELL AND FUEL CELL SYSTEM

(71) Applicant: CONNEXX SYSTEMS CORPORATION, Kyoto (JP)

(72) Inventor: Naoyoshi Kachi, Osaka (JP)

(73) Assignee: Connexx Systems Corporation, Kyoto (JP)

( * ) Notice: Subject to any disclaimer, the term of this patent is extended or adjusted under 35 U.S.C. 154(b) by 909 days.

(21) Appl. No.: 14/072,300

(22) Filed: Nov. 5, 2013

(65) Prior Publication Data
US 2014/0127599 A1    May 8, 2014

(30) Foreign Application Priority Data

Nov. 7, 2012   (JP) .................................. 2012-245706

(51) Int. Cl.
*H01M 8/04*     (2016.01)
*H01M 8/04007*  (2016.01)
(Continued)

(52) U.S. Cl.
CPC ....... *H01M 8/04007* (2013.01); *H01M 8/004* (2013.01); *H01M 8/0271* (2013.01);
(Continued)

(58) Field of Classification Search
CPC .. H01M 8/004; H01M 8/0271; H01M 8/0278; H01M 8/04007; H01M 8/12
(Continued)

(56) References Cited

U.S. PATENT DOCUMENTS 4,098,958 A * 7/1978 Bettman ................ H01G 9/21
                                              429/11
4,831,965 A * 5/1989 Brian .................... H01M 8/12
                                              118/715
(Continued)

FOREIGN PATENT DOCUMENTS

EP    1 325 774 A1    7/2003
EP    2 696 416 A1    2/2014
(Continued)

OTHER PUBLICATIONS http://www.gnbvalves.com/pdf/Leak_Rate.pdf, date accessed: Mar. 9, 2016.*

*Primary Examiner* — Jonathan Jelsma
*Assistant Examiner* — Rashid Alam
(74) *Attorney, Agent, or Firm* — Muncy, Geissler, Olds & Lowe, P.C.

(57) ABSTRACT

The compact fuel cell which can efficiently perform heating and can be repeatedly used includes a solid electrolyte, an anode that is formed on one surface of the solid electrolyte, a cathode that is formed on another surface of the solid electrolyte, an anode fuel material, a heating portion for heating and maintaining the solid electrolyte and the anode fuel material at a temperature equal to or higher than a predetermined level, and a sealing portion that is installed in the solid electrolyte, forms a sealed space sealing the anode and the anode fuel material together with the solid electrolyte and the heating portion, and can repeatedly open and close, in which a helium leak rate of the sealed space is maintained at $1\times10^{-2}$ Pa·m$^3$/sec or a lower rate.

18 Claims, 19 Drawing Sheets

(51) Int. Cl.
*H01M 8/243* (2016.01)
*H01M 8/00* (2016.01)
*H01M 8/0271* (2016.01)
*H01M 8/124* (2016.01)
*H01M 8/1246* (2016.01)
*H01M 8/1253* (2016.01)
*H01M 8/126* (2016.01)
*H01M 8/0276* (2016.01)
*H01M 8/12* (2016.01)

(52) U.S. Cl.
CPC ......... *H01M 8/0278* (2013.01); *H01M 8/124* (2013.01); *H01M 8/126* (2013.01); *H01M 8/1246* (2013.01); *H01M 8/1253* (2013.01); *H01M 8/1266* (2013.01); *H01M 8/243* (2013.01); *H01M 8/12* (2013.01); *Y02E 60/525* (2013.01); *Y02P 70/56* (2015.11)

(58) Field of Classification Search
USPC ........................................................ 429/434
See application file for complete search history.

(56) References Cited

U.S. PATENT DOCUMENTS

| | | | | |
|---|---|---|---|---|
| 5,336,570 | A * | 8/1994 | Dodge, Jr. | H01M 8/0271 429/465 |
| 2002/0061426 | A1 * | 5/2002 | Imaseki | H01M 8/04029 429/413 |
| 2003/0096147 | A1 | 5/2003 | Badding et al. | |
| 2003/0134170 | A1 * | 7/2003 | Sarkar | C04B 38/06 429/423 |
| 2004/0126637 | A1 * | 7/2004 | Barbezat | C23C 4/02 429/430 |
| 2005/0224348 | A1 * | 10/2005 | Satou | G01N 27/4077 204/424 |
| 2007/0048576 | A1 * | 3/2007 | McKenzie | H01M 4/244 429/406 |
| 2007/0054170 | A1 * | 3/2007 | Isenberg | H01B 1/122 204/424 |
| 2009/0098419 | A1 * | 4/2009 | Eickhoff | H01M 8/04037 429/9 |
| 2012/0129080 | A1 * | 5/2012 | Kim | H01M 8/0208 429/508 |
| 2012/0288775 | A1 * | 11/2012 | Ishida | H01M 8/04007 429/421 |

FOREIGN PATENT DOCUMENTS

| | | | |
|---|---|---|---|
| JP | 2002-083517 A | 3/2002 | |
| JP | 2011-040285 | 2/2011 | |
| JP | 4821937 | 9/2011 | |
| JP | 2012-115807 | 6/2012 | |
| WO | WO 2011/052283 A1 | 5/2011 | |
| WO | WO 2011077969 A1 * | 6/2011 | ........ H01M 8/04007 |
| WO | WO 2012/137682 A1 | 10/2012 | |

* cited by examiner

FUEL CELL AND FUEL CELL SYSTEM

BACKGROUND OF THE INVENTION

The present invention relates to a fuel cell which is useful as a stationary power source or a power source for moving objects such as cars, and as a portable power source. Particularly, the present invention relates to a fuel cell having a fuel gas regeneration apparatus and a fuel cell system using the fuel cell.

A fuel cell is means for generating power by supplying fuel gas. The fuel cell is expected to be applicable as a stationary middle-sized energy storage apparatus or as a driving source for electric cars or hybrid cars. Moreover, research and development are in progress so as to use the fuel cell as a power source for portable instruments such as mobile phones and laptop computers by realizing weight lightening and miniaturizing of the fuel cell.

Since the efficiency of electric energy obtained from a fuel cell is high in principle, it could be an efficient energy storage device if energy can be saved. In addition, since the fuel cell is a power generation mode having a low environmental load, the fuel cell is expected to be a key for resolving global energy and environmental problems.

Among fuel cells, a solid oxide fuel cell (SOFC) using an inorganic solid electrolyte having oxygen conductivity is known as an excellent eco-friendly power generation apparatus having a high power generation efficiency.

However, a fuel cell requires large-scale infrastructure development such as a pipe line or high-pressure gas cylinder equipment for supplying fuel gas such as hydrogen or carbon monoxide. Moreover, even methanol, which is relatively easily obtained as a fuel gas source, has a problem that establishment of the distribution thereof would take numerous years.

Therefore, as a countermeasure for these problems, JP 4821937 B proposes a repeatedly usable solid oxide fuel cell not requiring infrastructure equipment for supplying gas, in which a hydrogen-generating member such as iron that generates hydrogen by reacting with water is provided to the fuel cell body, the hydrogen generated from the hydrogen-generating member is supplied to a fuel electrode, and the hydrogen-generating member is reduced by electrical charging.

Furthermore, JP 2011-40285 A proposes a solid oxide fuel cell in which solid-state carbon is installed in a fuel electrode side of the fuel cell body, the solid-state carbon is oxidized by power generation to generate carbon dioxide, the generated carbon dioxide is converted into carbon monoxide and the carbon monoxide is supplied again to the fuel electrode.

As described in JP 4821937 B and JP 2011-40285 A, novel solid oxide fuel cells regenerating fuel gas inside the system by using iron powder or carbon have been proposed. The solid oxide fuel cell that has a constitution for regenerating fuel gas in its system as described above is called a stand-alone SOFC.

SUMMARY OF THE INVENTION

JP 4821937 B and JP 2011-40285 A describe that since infrastructure for supplying fuel is not necessary, the fuel cell can be easily miniaturized. However, actually, being high-temperature type cells, these cells require not only a power generation mechanism but also a heating mechanism and a heat-retention mechanism, and this leads to a problem that they take up much space.

Moreover, JP 4821937 B describes that if the space between the fuel electrode and the hydrogen-generating member is made into a completely sealed space, hydrogen and water do not need to be replenished from the outside, and a repeatedly usable fuel cell can be realized. The "completely sealed space" mentioned herein, which is a strict requirement relating to air-tightness, is not necessary for conventional fuel cells. This is because in the conventional fuel cells, the fuel gas is continuously supplied, and even if the fuel gas slightly leaks outside the system, it influences the power generation ability to a small extent.

However, in a solid oxide fuel cell operated particularly at a high temperature of about 300° C. to 1,000° C., it is practically extremely difficult to realize the airtight sealed space from which the fuel gas does not leak. In a region of a high temperature exceeding 300° C., it is impossible to use heat-resistant rubber or a gasket made of an organic substance that is usually used for realizing airtight sealed spaces, and usable sealing means are limited to a metal gasket, ceramic paste, and the like. Based on JP 4821937 B, by using a metal gasket, ceramic paste, or molten glass, a sealed space was formed between the fuel electrode and the hydrogen-generating member to constitute a solid oxide fuel cell, the sealed space was filled with hydrogen gas, and an open-circuit voltage was measured. As a result, after about 5 hours from the gas injection, the voltage rapidly decreased to around 0 V. This shows that in a high temperature region, a metal gasket or ceramic paste can secure airtightness only for about several hours. The reason why the airtightness is not easily secured in a high temperature region is that, for example, since the materials to be connected and the sealing material have different thermal expansion coefficients, when the temperature is increased, the airtightness is impaired due to the expansion and rupture of the sealing material. Furthermore, during the operation of a fuel cell, a resting period at room temperature and an operating period at a high temperature alternate with each other intermittently, and the duration of use thereof exceeds several years. The conventional airtightness maintaining method that seals the high-temperature portion by using metals, ceramics, molten glass, and the like has a high possibility that the airtightness may deteriorate due to the repetition of expansion and contraction of the materials and lacks reliability.

In addition, when the solid oxide fuel cell is repeatedly operated at a high temperature of about 300° C. to 1,000° C., the solid oxide itself does not endure thermal impact and cracks in many cases. Similarly to the sealing material, if the solid oxide itself cracks, the airtightness of the sealed space is impaired.

In the fuel cell disclosed in JP 4821937 B, an electrochemical oxidation-reduction reaction based on the charging and discharge in the fuel cell and a chemical oxidation-reduction reaction in the hydrogen-generating member simultaneously occur. Water or hydrogen is involved in both the reactions, and due to leaking of water or hydrogen from the sealed space, the reaction rate and the equilibrium state of each reaction change, and accordingly, the properties of the fuel cell are greatly influenced by leaking of the internal gas. Moreover, even in the fuel cell disclosed in JP 2011-40285 A, carbon dioxide generated at the time of discharge is reused by being converted into carbon monoxide, and thus, similarly to JP 4821937 B, the leaking of carbon dioxide from the sealed space greatly influences the properties of the fuel cell. Accordingly, the knowledge about to what degree the leakage of the internal gas needs to be suppressed to obtain a rechargeable battery suitable for practical use is extremely important to make the fuel cells disclosed in JP 4821937 B and JP 2011-40285 A suitable for practical use. In practice, the inventors of the present invention created designs for studying the fuel cells disclosed in JP 4821937 B and JP 2011-40285 A, and conducted experiments. As a result, they found that depending on the airtightness of the fuel electrode and the hydrogen-generating member, the properties such as a cycle life and capacity of the fuel cell markedly change.

Moreover, since the above fuel cells are sealed systems, mechanical failure easily occurs due to the change in the internal pressure, and the conventional inventions have proposed iron powder, solid-state carbon, and the like as anode fuel material. However, there has been a demand for the use of metal scrap, solid organic substances such as household waste, and the like, which can be more easily obtained, as the anode fuel material.

Based on the above circumstances, a first object of the present invention is to provide a compact fuel cell which can efficiently perform heating and in which a space taken up by a thermal insulating material is reduced. Moreover, a second object of the present invention is to provide a fuel cell which makes it possible to seal a closed space of gas in a high temperature region and has a sealing portion that can be repeatedly opened and closed. In addition, a third object of the present invention is to provide a fuel cell which has a pressure-regulating mechanism that can maintain a pressure of the closed space of gas within a predetermined range during operation. Further, a fourth object of the present invention is to provide a fuel cell which can generate power by using, as anode fuel material, a substance such as metal scrap, solid or liquid organic compounds such as household waste, and the like which is introduced from the outside of the fuel cell, and water.

The present invention provides a fuel cell comprising: an airtight solid electrolyte that conducts oxygen ions; an anode that is formed in one surface of the solid electrolyte and oxidizes reducing gas into oxidation gas when discharging; a cathode that is formed in another surface of the solid electrolyte and reduces oxygen into oxygen ions when discharging; an anode fuel material that generates the reducing gas and becomes itself an oxide by reacting with the oxidation gas; a heating portion for heating and maintaining the solid electrolyte and the anode fuel material at a temperature equal to or higher than a predetermined level; and a sealing portion that is installed in the solid electrolyte, forms a sealed space sealing the anode and the anode fuel material together with the solid electrolyte and the heating portion, and can repeatedly open and close, wherein when the sealed space is sealed using heat-resistant rubber or a gasket made of an organic substance, and the fuel cell is operated, a heating element of the heating portion is separated from the sealing portion by a distance L, such that a helium leak rate of the sealed space during an operation of the fuel cell is maintained at $1 \times 10^{-2}$ Pa·m$^3$/sec or a lower rate.

Preferably, the solid electrolyte is cylindrical, the cathode is formed into a cylindrical shape along the outer surface of the cylindrical solid electrolyte, the anode is formed into a cylindrical shape along the inner surface of the solid electrolyte, the anode fuel material is cylindrical and disposed inside the anode, the heating portion is columnar and disposed inside the cylindrical anode fuel material, the cylindrical solid electrolyte accommodates inside thereof, the cylindrical anode, the cylindrical anode fuel material, and the columnar heating portion disposed inside the cylindrical anode fuel material, one end of the cylindrical solid electrolyte is blocked, and another end of the cylindrical solid electrolyte is sealed by the sealing portion which is penetrated by the columnar heating portion and is in close contact with the outer surface of the columnar heating portion.

Preferably, the sealing portion includes a sealing stopper that is connected to the one end of the cylindrical solid electrolyte by one of the brazing, laser welding, TIG welding, solder welding, ultrasonic welding, gasket sealing, and O-ring sealing, or by a combination of these.

Preferably, the reducing gas is hydrogen, carbon monoxide, nitrogen monoxide, or a mixed gas of these, and the anode fuel material comprises iron particles or iron powder and a shape-retaining material which comprises a sintering-resistant material selected from among aluminum oxide, silicon dioxide, magnesium oxide, zirconium oxide and a mixture of these, at least a portion of the surface of the anode fuel material is covered with the shape-retaining material, and a proportion of a mass of the shape-retaining material based on the anode fuel material is from 0.1% to 5%.

Preferably, the anode reduces the oxidation gas into the reducing gas when charging, the cathode oxidizes the oxygen ions into oxygen when charging, and the oxide of the anode fuel material generates the oxidation gas and becomes itself the anode fuel material by reversibly reacting with the reducing gas.

Preferably, the anode fuel material is at least one kind of substance selected from a group consisting of lithium, sodium, magnesium, calcium, aluminum, silicon, zinc, iron, lead, tin, nickel, carbon, and a substance containing at least one or more kinds of elements among the above as a main component.

Preferably, the solid electrolyte is one of an oxide having a fluorite structure, an oxide having a perovskite structure, and an oxide having an apatite structure, or a combination of these, or alternatively, the solid electrolyte is one of yttria-stabilized zirconia, a cerium-gadolinium oxide, a BIMEVOX compound represented by $Bi_2M_xV_{1-x}O_{5.5-3x/2-\delta}$ (M is a transition metal), lanthanum gallate, barium cerate, and $La_{1-x}Sr_xGa_{1-y}Mg_yO_{3-\delta}$, or a combination of these.

Preferably, the anode fuel material is a module carried in a cassette, a bag, or a box and is detachable, attachable, and replaceable.

The anode fuel material may not be electrically in contact with the anode, and the anode fuel material may be electrically in contact with the anode.

Preferably, the sealed space includes a pressure-absorbing portion composed of a bellows and/or a gas absorber for maintaining the internal pressure within a predetermined range.

Preferably, the sealing portion is kept at a temperature equal to or lower than 300° C.

The present invention provides a fuel cell system comprising a plurality of the fuel cells described above that are connected to one another in series or in parallel. Preferably, the fuel cell system further comprises an anode fuel material used in common.

The present invention provides a fuel cell comprising: a cylindrical solid electrolyte that has ion conductivity and air-tightness and conducts oxygen ions from an outer surface thereof to an inner surface thereof; a cylindrical cathode that is formed on the outer surface of the solid electrolyte and reduces oxygen into the oxygen ions when discharging; a cylindrical anode that is formed on the inner surface of the solid electrolyte and oxidizes reducing gas which is used as fuel when discharging into oxidation gas by using the oxygen ions conducted from the outer surface of the solid electrolyte to the inner surface thereof; a columnar anode fuel material that is disposed inside the anode and reduces the oxidation gas to generate the reducing gas and becomes itself an oxide by reacting with the oxidation gas oxidized by the anode; and a cylindrical heating portion that is disposed outside the cathode and heats at least the solid electrolyte to maintain a portion of the solid electrolyte at a temperature equal to or higher than a predetermined level, wherein both ends of the cylindrical solid electrolyte are blocked and a sealed space in which the cylindrical anode and the columnar anode fuel material are sealed is formed inside the cylindrical solid electrolyte, at least one of the both ends of the cylindrical solid electrolyte is blocked by a sealing portion, the sealing portion is repeatedly detachable, and a heating element of the heating portion is separated from the sealing portion by a distance L such that the temperature of the sealing portion becomes less than 300° C. during an operation of the fuel cell.

The present invention provides a fuel cell comprising: a solid electrolyte that has ion conductivity and air-tightness and conducts oxygen ions from a front surface thereof to a rear surface thereof; a cathode that is formed on the front surface of the solid electrolyte and reduces oxygen into the oxygen ions when discharging; an anode that is formed on the rear surface of the solid electrolyte and oxidizes reducing gas which is used as fuel when discharging into oxidation gas by using the oxygen ions conducted from the front surface of the solid electrolyte to the rear surface thereof; an anode fuel material that reduces the oxidation gas to generate the reducing gas and becomes itself an oxide by reacting with the oxidation gas oxidized by the anode; a heating portion that heats at least the solid electrolyte to maintain a portion of the solid electrolyte at a temperature equal to or higher than a predetermined level; and at least one sealing portion that forms a sealed space together with the solid electrolyte, wherein the sealed space accommodates the anode and the anode fuel material, the at least one sealing portion is repeatedly detachable, and a heating element of the heating portion is separated from the sealing portion by a predetermined distance L, such that the temperature of the sealing portion becomes less than 300° C. during an operation of the fuel cell.

According to the present invention, a compact fuel cell which can efficiently perform heating can be provided.

Moreover, according to the present invention, a fuel cell which can maintain sealing properties of a closed space of gas even in a high temperature region and has a sealing portion that can be repeatedly opened and closed can be provided.

In addition, according to the present invention, a pressure of the closed space of gas can be maintained within a predetermined range during the operation.

Furthermore, according to the present invention, power can be generated by using, as fuel, an organic compound that is introduced into the closed space from the outside of the fuel cell and water.

DETAILED DESCRIPTION OF THE INVENTION

Hereinafter, the embodiments of the present invention will be described based on the attached drawings.

First Embodiment

Figure 1:
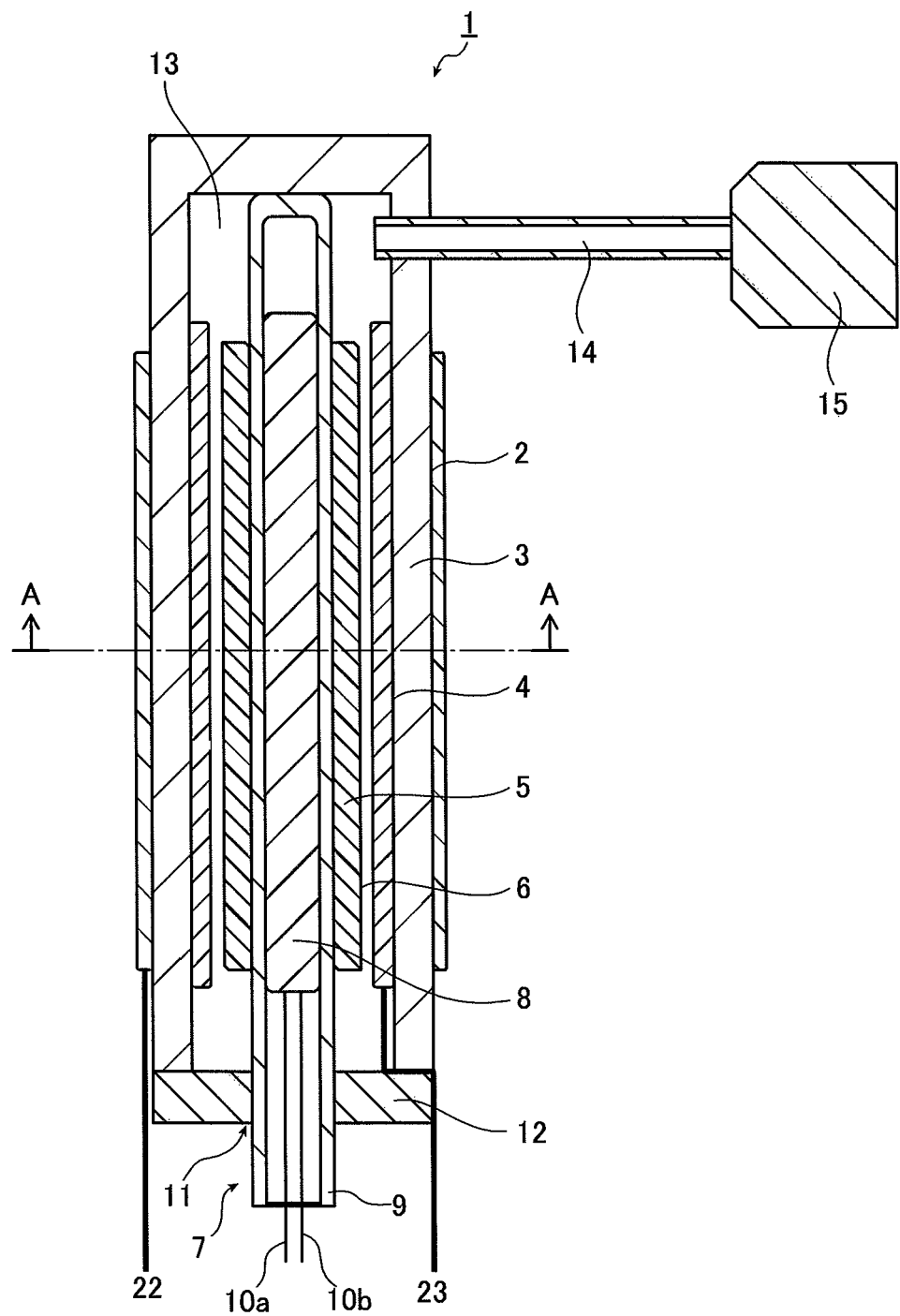
FIG. 1 is a view showing the entire constitution of a fuel cell according to a first embodiment of the present invention.
Figure 2:
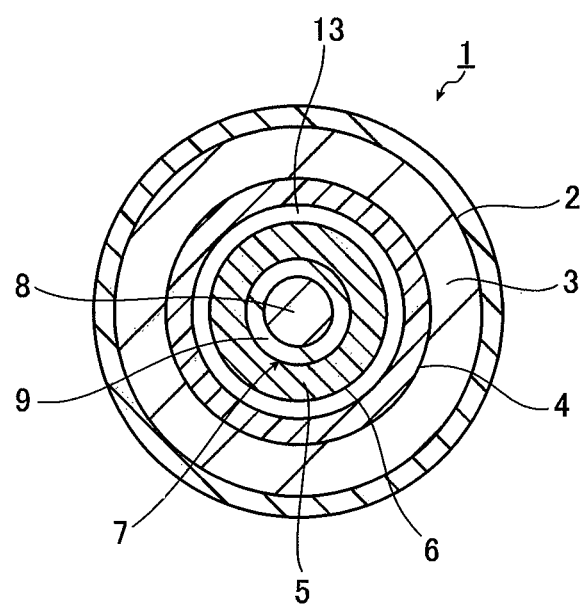
FIG. 2 is a transverse cross-sectional view of the fuel cell according to the first embodiment of the present invention.

FIG. 1 shows the entire constitution of a fuel cell 1 according to the first embodiment of the present invention, and FIG. 2 shows a cross-sectional view obtained when the fuel cell 1 of FIG. 1 is cut along the cross-section A-A.

As FIGS. 1 and 2 clearly show, the fuel cell 1 includes a cathode 2, a solid electrolyte 3, an anode 4, and an anode fuel material 5 (and an anode fuel case 6) that are each formed in a cylindrical shape, in this order from the outside, and includes a heating portion 7 at the center of the anode fuel material 5.

The cathode 2, the solid electrolyte 3, and the anode 4 are in close contact with one another, and between the anode 4 and the anode fuel material 5 (and the anode fuel case 6), a predetermined gap is disposed so as to prevent the anode 4 and the anode fuel material 5 from coming into contact with each other.

One end of the cylindrical solid electrolyte 3 is blocked, the other end thereof is provided with a cap 12 having a through-hole 11, and a heating portion 7 is inserted into the through-hole 11 without a clearance. Accordingly, inside the cylindrical solid electrolyte 3, a sealed space 13 is formed by the cap 12 and the heating portion 7. Moreover, the anode 4 and the anode fuel material 5 are sealed by the sealed space 13.

Further, in order to maintain the internal pressure of the sealed space 13 within a predetermined range, a pressure-absorbing portion 15 connected to the sealed space 13 through a connection path 14 is installed.

In addition, a cathode current collector 22 and an anode current collector 23 are connected to the cathode 2 and the anode 4 respectively and led out as terminals.

The cathode 2 is formed of, for example, $La_{1-x}SrMnO_3$, $La_{1-x}SrCoO_3$ (0<x<3, preferably, x is equal to about 0.1 to 0.3), $Sm_{0.5}Sr_{0.5}CoO_3$, and the like. This electrode does not only have the function of a catalyst in an oxygen reduction reaction and an oxidation reaction but also has electron conductivity, gas permeability, and stability in an oxidative atmosphere.

The solid electrolyte 3 is formed of inorganic materials that exhibit oxygen ion conductivity at 300° C. or a higher temperature. Examples of the inorganic materials include oxides having a fluorite structure, oxides having a perovskite structure, oxides having an apatite structure, and combinations of these. Particularly, examples of the preferable material in the oxides having a fluorite structure include yttria-stabilized zirconia represented by $(ZrO_2)_x(Y_2O_3)_{1-x}$ (0<x 1), cerium-gadolinium oxides represented by $Ce_{1-x}Gd_xO_{2-s}$ (0<x<1, s<2), a BIMEVOX compound which contains bismuth and vanadium and is represented by $Bi_2M_xV_{1-x}O_{5.5-\delta}$ (M is a transition metal such as Mg and Cu, 0<x<1, δ<5.5), combinations of these, and the like. Examples of the preferable material in the oxide having a perovskite structure include lanthanum gallate, barium cerate, oxides represented by $La_{1-x}Sr_xGa_{1-y}Mg_yO_{3-\delta}$ (LSGM, 0<x<1, 0<y<1, δ<3), combinations of these, and the like.

These materials are airtight and watertight and are not water-permeable. Moreover, these materials practically do not conduct oxygen ions at room temperature. Therefore, it is preferable the solid electrolyte 3 be heated and kept at a temperature exceeding 300° C. and preferably at 500° C. to 900° C., when the fuel cell 1 is operated.

Solid electrolytes generally exhibit airtightness that does not allow reducing gas, oxidation gas, or air to permeate them. Particularly, the solid electrolyte 3 used in the present invention is required to have airtightness with which a helium leak rate of the sealed space 13 is maintained at $1\times10^{-2}$ Pa·m$^3$/sec or a lower rate. Moreover, in order to improve oxygen ion conductivity, the solid electrolyte 3 preferably has a film shape, a plate shape, a foil shape, or a combination of these.

The anode 4 is formed of, for example, nickel or platina. The anode 4 does not only have the function of a catalyst in oxidation and reduction reactions of fuel gas such as hydrogen or carbon monoxide but also has electron conductivity, gas permeability, and stability in a reductive atmosphere in the presence of water vapor. When nickel is used alone as the anode 4, this leads to problems that the function thereof deteriorates as sintering progresses and the coefficient of thermal expansion thereof becomes different from that of the solid electrolyte 3. Therefore, it is preferable for the anode 4 to be used by being formed into cermet with yttria-stabilized zirconia.

The anode fuel material 5 is formed of, for example, at least one kind of powder or the like selected from a group consisting of lithium, sodium, magnesium, calcium, aluminum, silicon, zinc, iron, lead, carbon, and alloys containing one or more kinds of these elements, as a main component. Moreover, as described later, the anode fuel material 5 may be formed by mixing the above powder or the like with aluminum oxide, aluminum hydroxide, and a mixture of these as a shape-retaining material. The powder of metals such as aluminum, silicon, zinc, and magnesium or the powder of alloys containing one or more kinds of elements among aluminum, silicon, zinc, and magnesium as a main component does not easily react with water at room temperature of 20° C. to 30° C., but when heated, they easily react with water. Accordingly, they are particularly effective when hydrogen is used as fuel gas.

The operation temperature of the anode fuel material 5 is not particularly limited. However, when hydrogen is used as reducing gas, if the inside of the anode fuel material 5 is heated and kept at 100° C. or a higher temperature, water generated in the anode 4 becomes water vapor and is diffused to the entire anode fuel material 5, and accordingly, the reaction between water and the anode fuel material 5 occurs more efficiently. Furthermore, when a metal such as aluminum, silicon, zinc, or magnesium or an alloy containing one or more kinds of elements among aluminum, silicon, zinc, and magnesium as a main component is used as the anode fuel material 5, if the inside of the anode fuel material 5 is heated and kept at 100° C. or a higher temperature, the material easily reacts with water, and accordingly, a hydrogen generation reaction occurs more efficiently.

It is preferable that the anode fuel material 5 be coated with a shape-retaining material as a metal oxide which is in an oxidation state all the time when a partial pressure of oxidation gas is equal to or higher than ¹⁄₁,₀₀₀ of a partial pressure of reducing gas and has a melting point of 1,000° C. or higher. If coated with such a shape-retaining material, sintering of the anode fuel material is inhibited, and the oxidation-reduction reaction can be repeatedly performed. The proportion of a mass of the shape-retaining material contained in the anode fuel material 5 is not particularly limited. However, in order not to excessively suppress the rate of oxidation-reduction reaction, the proportion is preferably from 0.1% to 5%. Preferable examples of the shape-retaining material include aluminum oxide, silicon dioxide, magnesium oxide, zirconium oxide, and a mixture of these. These have a particularly high melting point and exert an excellent sintering inhibitory effect.

Moreover, being an inexpensive material and making it easy to reversibly cause oxidation-reduction, iron is a preferable example of the anode fuel material 5. If iron powder is coated with the shape-retaining material formed of aluminum oxide, silicon dioxide, magnesium oxide, zirconium oxide, or a mixture of these, sintering of the iron powder is inhibited, and the oxidation-reduction reaction can be repeatedly performed. Methods of coating iron with the shape-retaining material are not particularly limited. However, as a method of coating iron with aluminum oxide, for example, there is a method of adding aluminum nitrate and iron or iron oxide to a solvent such as water or ethanol, evaporating the solvent by heating under stirring, and then baking the resultant for about 2 hours at 400° C. to 800° C. As a method of coating iron with silicon dioxide, for example, there is a method of adding tetraethyl orthosilicate and iron or iron oxide to a solvent such as water or ethanol, evaporating the solvent by heating under stirring, and then baking the resultant for about 2 hours at 200° C. to 800° C.

The anode fuel case 6 plays a role of holding the anode fuel material 5. In order to accelerate the reaction between the anode fuel material 5 and oxidation gas, it is preferable that the anode fuel case 6 have a mesh shape or a porous shape. Preferable examples of the anode fuel case 6 include ceramic fiber, a metal mesh coated with ceramics, and low-density porous alumina. When the anode fuel case 6 has a porous shape, the porosity is preferably 20% or higher. This is because depending on the porosity of the anode fuel case 6, output characteristics of the fuel cell vary, and the higher the porosity is, the more the output is improved.

The anode fuel case 6 has an annular shape that is long and slender in a longitudinal direction and is installed around the heating portion 7 while holding the anode fuel material 5 in the inside thereof.

The heating portion 7 is composed of a heating element 8 and a heating element case 9 formed around the heating element 8, and the heating element 8 is connected to wirings 10a and 10b. The examples of the heating element 8 include a resistance heating element, an arc heater, an induction heater, a dielectric heater, a microwave heater, a gas heater, a plasma heater, a lamp heater, and an infrared heater. Among these, the examples of the resistance heating element include Ni—Cr, SiC, C, $MoSi_2$, and the like. The wirings 10a and 10b are lines for transmitting power or temperature information. In addition, the heating element case 9 made of ceramics or a metal seals the heating element 8 and prevents the heating element 8 from deteriorating by coming into contact with hydrogen, water vapor, and other harmful substances or vapor thereof.

By being supplied with power from the wirings 10a and 10b, the heating element 8 can be heated up to a temperature of about 850° C. to 1,000° C. In Example 1, the heating element 8 is constituted with a nichrome wire heater, and the heating element case 9 is constituted with stainless steel. Moreover, the wirings 10a and 10b are paired to form singular or plural electric wire groups. Sometimes, the wirings 10a and 10b are in the form of only a pair of paths used as a path for supplying energy to the heating element, and sometimes they are in the form of a combination of the above-mentioned pair of paths and a pair of paths for forming signal wires of thermocouple disposed near the heating element.

The heating portion 7 plays a role of controlling the fuel cell to be at a predetermined temperature by causing the heating element 8 to heat up to a temperature of about 650° C. to 1,000° C. At the initial stage of the operation, the heating portion 7 heats and maintains the solid electrolyte 3 at a predetermined temperature. When the fuel cell is in a steady operation state, the heating portion 7 may maintain a steady operation temperature by heating or cooling the fuel cell. Further, the heating portion 7 may be equipped with an external control apparatus which can externally set or change temperature control conditions such as a preset temperature. The heating portion 7 may also be equipped with a controller for controlling the temperature of the heating element 8, and in this manner, the reaction rate of the fuel cell becomes autonomously controllable according to the temperature of the heating portion 7. Examples of the heating portion 7 include a combination of the heating element 8 and the heating element case 9 and a combination of these with an air blower. The air blower plays a role of a cooler. By blowing of air into the heating element case 9, the heating element 8 is cooled, and the temperature of the heating element 8 is controlled.

The sealed space 13 is formed of the cylindrical solid electrolyte 3 of which one end is sealed, the cap 12 which is installed in the other end of the cylindrical solid electrolyte 3 and has the through-hole 11 that the heating portion 7 penetrates, and the heating element case 9 of the heating portion 7.

The cap 12 is airtightly joined to the other end of the solid electrolyte 3 by means of epoxy adhesion or the like, and the through-hole 11 of the cap 12 is also airtightly joined to the heating element case 9 by means of epoxy adhesion or the like. Accordingly, the sealed space 13 of the solid electrolyte 3 is sealed by the cap 12 and the heating element case 9.

The anode 4 and the anode fuel material 5 are present inside the sealed space 13, and a degree of airtightness needs to be at a level in which a helium leak rate of the sealed space 13 is maintained at $1\times10^{-2}$ Pa·m³/sec or a lower rate.

Furthermore, the connection path 14 for communicating with the sealed space 13 is provided to the fuel cell 1, and the connection path 14 is connected to the pressure-absorbing portion 15. The pressure-absorbing portion 15 is made of, for example, a metallic bellows or a diaphragm and absorbs pressure fluctuation caused by water vapor generated inside the sealed space 13, thereby maintaining the internal pressure of the sealed space 13 within a predetermined range.

The material of the cathode current collector 22 is not particularly limited. However, it is preferable that the material have stability in an oxidative atmosphere, and examples thereof include titanium, stainless steel, silver, and alloys containing these as a main component. Other examples thereof include the materials obtained by plating nickel, titanium, stainless steel, silver, or alloys containing these as a main component with platinum or gold.

The material of the anode current collector 23 is not particularly limited. However, the materials are preferably metals not oxidized in a region of partial pressure ratio where a logarithmic value of a value obtained by dividing a partial pressure of oxidation gas by a partial pressure of reducing gas becomes 4.5 or less. Examples thereof include silver, platinum, gold, copper, titanium stainless steel, and alloys containing these as a main component. Herein, the "main component" refers to a component that is contained in an amount of 80% by mass or more and more preferably in an amount of 90% by mass or more, based on the entire alloy.

Next, the operation of the fuel cell 1 will be described.

Figure 3:
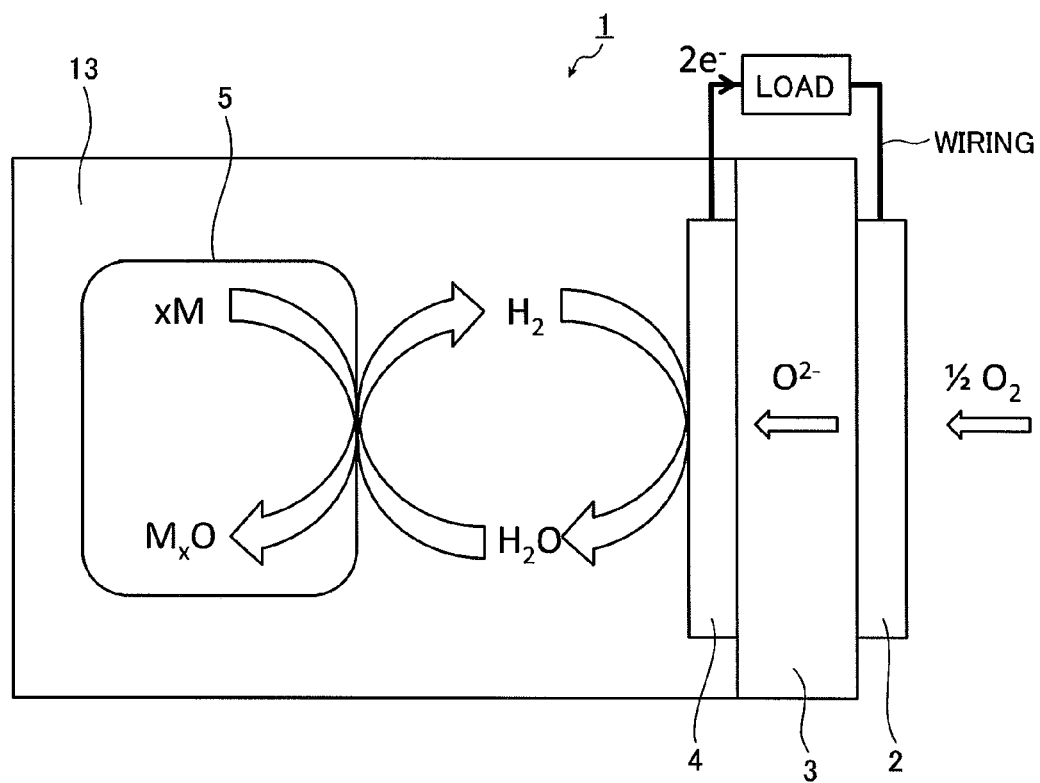
FIG. 3 is a view for illustrating the operation of the fuel cell according to the first embodiment of the present invention.

FIG. 3 is a view schematically showing the operation of the fuel cell 1 according to the first embodiment of the present invention.

The fuel cell 1 includes the cathode 2, the solid electrolyte 3, the anode 4, and the anode fuel material 5. The cathode 2, the solid electrolyte 3, and the anode 4 are in close contact with and connected to one another, and the anode 4 and the anode fuel material 5 are installed inside the sealed space 13 that is formed by the solid electrolyte 3.

When the cathode 2, the solid electrolyte 3, the anode 4, and the anode fuel material 5 are heated to about 850° C. to 1,000° C. by the heating portion 7 which is not shown in FIG. 3, the outside oxygen (½ $O_2$) is absorbed by the cathode 2, moves as oxygen ions ($O^{2-}$) in the inside of the solid electrolyte 3 from the cathode 2 to anode 4, and oxidizes hydrogen ($H_2$) inside the sealed space at the anode 4 to generate water ($H_2O$).

Through this reaction, an electric charge $2e^-$ of the oxygen ions ($O^{2-}$) flows from the anode 4 to the cathode 2 through the wiring, whereby current flows from the cathode 2 to the anode 4.

The generated water ($H_2O$) reacts with the anode fuel material 5 (xM) as water vapor, oxidizes the anode fuel material 5 (xM) (turns the anode fuel material 5 into $M_xO$), and becomes hydrogen ($H_2$) again.

The hydrogen ($H_2$) generated at the anode fuel material 5 reacts again with the oxygen ions ($O^{2-}$) at the anode 4 and becomes water ($H_2O$). Consequently, unless the anode fuel material 5 cannot be oxidized any more, the fuel cell 1 can be discharged.

During charging, a reverse reaction of the case of the discharge occurs. At the anode 4 of the fuel cell 1, water ($H_2O$) receives electric charges and decomposes into oxygen ions ($O^{2-}$) and hydrogen ($H_2$). The oxygen ions ($O^{2-}$) move from the anode 4 to the cathode 2 through the solid electrolyte 3, and the oxidized anode fuel material 5 ($M_xO$) is reduced by hydrogen ($H_2$), whereby returning to the anode fuel material 5 (xM) not being oxidized and water ($H_2O$). The generated water ($H_2O$) further receives electric charges at the anode 4 and decomposes into oxygen ions ($O^{2-}$) and hydrogen ($H_2$). Accordingly, during charging, the above reaction is repeated until the oxidized anode fuel material 5 ($M_xO$) is totally reduced.

In the heating portion 7, when power is supplied to the heating element 8 from the wirings 10*a* and 10*b*, the heating element 8 generates heat, whereby the anode fuel material 5, the anode 4, the solid electrolyte 3, and the cathode 2 around the heating element case 9 are heated. After increasing the temperature to a predetermined level, the heating portion 7 continuously maintains the temperature at a level appropriate for driving the fuel cell.

In addition, the internal atmospheric pressure of the sealed space 13 is regulated through the connection path 14 and the pressure-absorbing portion 15 that are not shown in FIG. 3. Accordingly, the internal atmospheric pressure of the sealed space 13 is not abnormally increased even by the heating performed by the heating portion 7 and the water vapor generated at the anode 4, and the sealing properties of the sealed space 13 are maintained.

As described above, the fuel cell 1 according to the first embodiment performs heating from the inside the fuel cell formed into a cylindrical shape. Therefore, the fuel cell itself can become compact by increasing a volume energy density of the cell.

Second Embodiment

In the first embodiment, the other end of the cylindrical solid electrolyte 3 of which one end is blocked is sealed with the cap 12, whereby the sealed space 13 in which the anode 4 and the anode fuel material 5 are sealed is formed.

Moreover, in the first embodiment, for generating power, the fuel cell 1 (the cathode 2, the solid electrolyte 3, the anode 4, and the anode fuel material 5) is heated by the heating portion 7 up to about 850° C. to 1,000° C. Therefore, with sealing means that is easily opened and closed, the sealed state of the sealed space 13 cannot be thoroughly maintained.

Accordingly, for example, in the constitution of the first embodiment, if the sealed space 13 is sealed by sealing means premised on the replacement of the anode fuel material 5, the space is not sufficiently sealed, so a life of the fuel cell is shortened.

Figure 4:
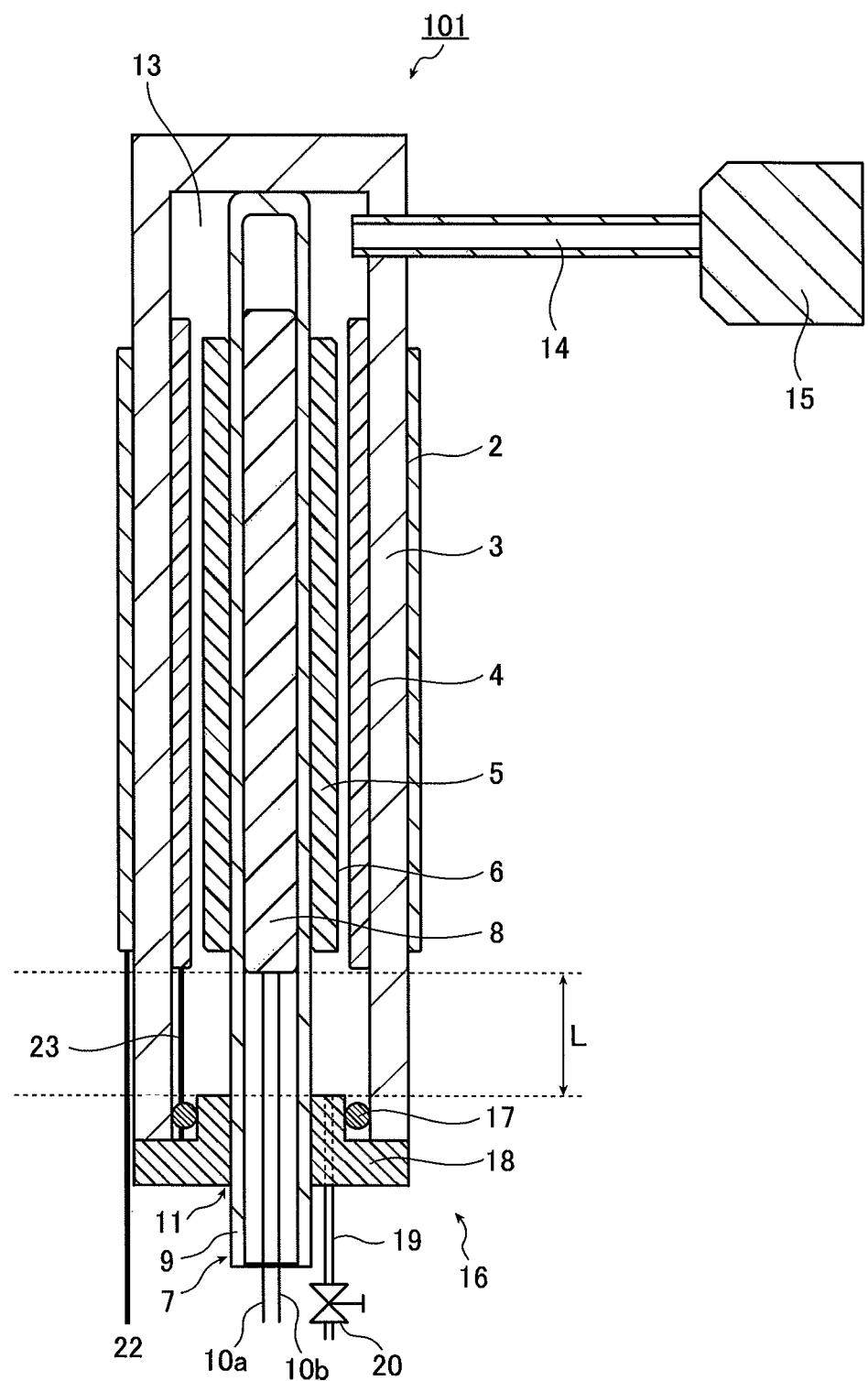
FIG. 4 is a view showing the entire constitution of a fuel cell according to a second embodiment of the present invention.

A fuel cell 101 according to the second embodiment is a countermeasure for the above problems that the above sealing means has, and FIG. 4 is a view showing the entire constitution of the fuel cell 101 according to the second embodiment. The constitution of the second embodiment differs from that of the first embodiment, in terms of the constitution of a sealing portion 16 that seals the cylindrical solid electrolyte 3.

As shown in FIG. 4, the cylindrical solid electrolyte 3 of the fuel cell 101 is formed into a long slender and shape, and the heating element 8 of the heating portion 7 is separated from the sealing portion 16 at the other end of the cylindrical solid electrolyte 3 by a sufficient distance L to form a space (temperature transition region) indicated by dotted lines.

Moreover, the sealing portion 16 is composed of an O-ring 17 and a sealing stopper 18 made of a metal. The sealing stopper 18 is provided with a through-hole 11*a* that the heating element case 9 of the heating portion 7 penetrates and a supply path 19 (needle valve) that can be opened or closed by a valve 20, and the heating element case 9 is grounded to the through-hole 11*a*. The O-ring 17 is constituted with heat-resistant silicone rubber or the like and seals the space between the sealing stopper 18 and the cylindrical solid electrolyte 3. In order to sufficiently seal the space, an adhesive such as ceramic paste may be used at the same time.

In a state where discharge has not yet been performed, reducing gas fills up the sealed space 13 where the anode 4 and the anode fuel material 5 are present. The reducing gas is supplied through the supply path 19 passing through the sealing stopper 18 and the valve 20, and at the time of operation (discharge), the valve is closed to form a closed space.

The reducing gas is not particularly limited as long as it is redox gas, and examples thereof include hydrogen, carbon monoxide, nitrogen monoxide, and a mixed gas of these. Through the reaction at the time of discharge, the reducing gas is oxidized at the anode 4 and turns into oxidation gas. The oxidation gas reacts with the anode fuel material 5, whereby reducing gas and an oxide of the anode fuel material are formed. This reaction continues until the reaction between the oxidation gas and the anode fuel material stops. The gas injected into the sealed space may not be reducing gas and may be oxidation gas.

In the fuel cell 101 according to the second embodiment, the sealed space 13 is sealed by the sealing portion 16 composed of the O-ring 17 and the sealing stopper 18. Since the sealing portion 16 is easily detachable, the anode fuel material 5 having undergone the reaction can be simply replaced.

If the temperature exceeds 300° C., the sealing properties of the sealing portion 16 markedly deteriorate, so the temperature of the sealing portion 16 needs to be kept at 300° C. or less.

In the second embodiment, the fuel cell 101 includes the sealing portion 16 composed of the O-ring 17 and the sealing stopper 18 as described above. Accordingly, if the sealing portion 16 is opened to remove the anode fuel material 5, which has been oxidized by reacting with the oxidation gas, from the sealed space 13, the unused anode fuel material 5 is newly installed in the anode fuel case 6, and the sealing portion 16 is closed, the oxidized anode fuel material 5 can be replaced with the unused anode fuel material 5.

When it is desired to shorten the time taken for charging the fuel cell of the present invention, simply by replacing the anode fuel material 5 and supplying oxidation gas, reducing gas can be newly obtained. That is, so-called quick charge becomes feasible. In order to facilitate the replacement and replenishing of the anode fuel material 5, it is preferable that the anode fuel case 6 accommodating the anode fuel material 5 be, for example, a container made of ceramics, a resin, or a metal that is perforated or is porous or has a shape of bag.

At the time of replacing the anode fuel material 5, the reducing gas, the oxidation gas, and the unreacted anode fuel material 5 are present as being mixed inside the anode fuel case 6. Accordingly, when the gas such as hydrogen having a wide explosion range is used as the reducing gas, if the anode fuel case 6 is opened to the outside as is, there is a possibility that the outside oxygen may react with the reducing gas and explode. In order to avoid such a risk, for example, it is desirable to inject inert fluid such as fluorinated oil into the anode fuel case 6 to cover and cool the anode fuel material 5 in the anode fuel case 6 with the inert fluid, and then open the case in an open space. The anode fuel case may be made into a module and may have the shape of a cassette, a bag, or a box.

Third Embodiment

Figure 5:
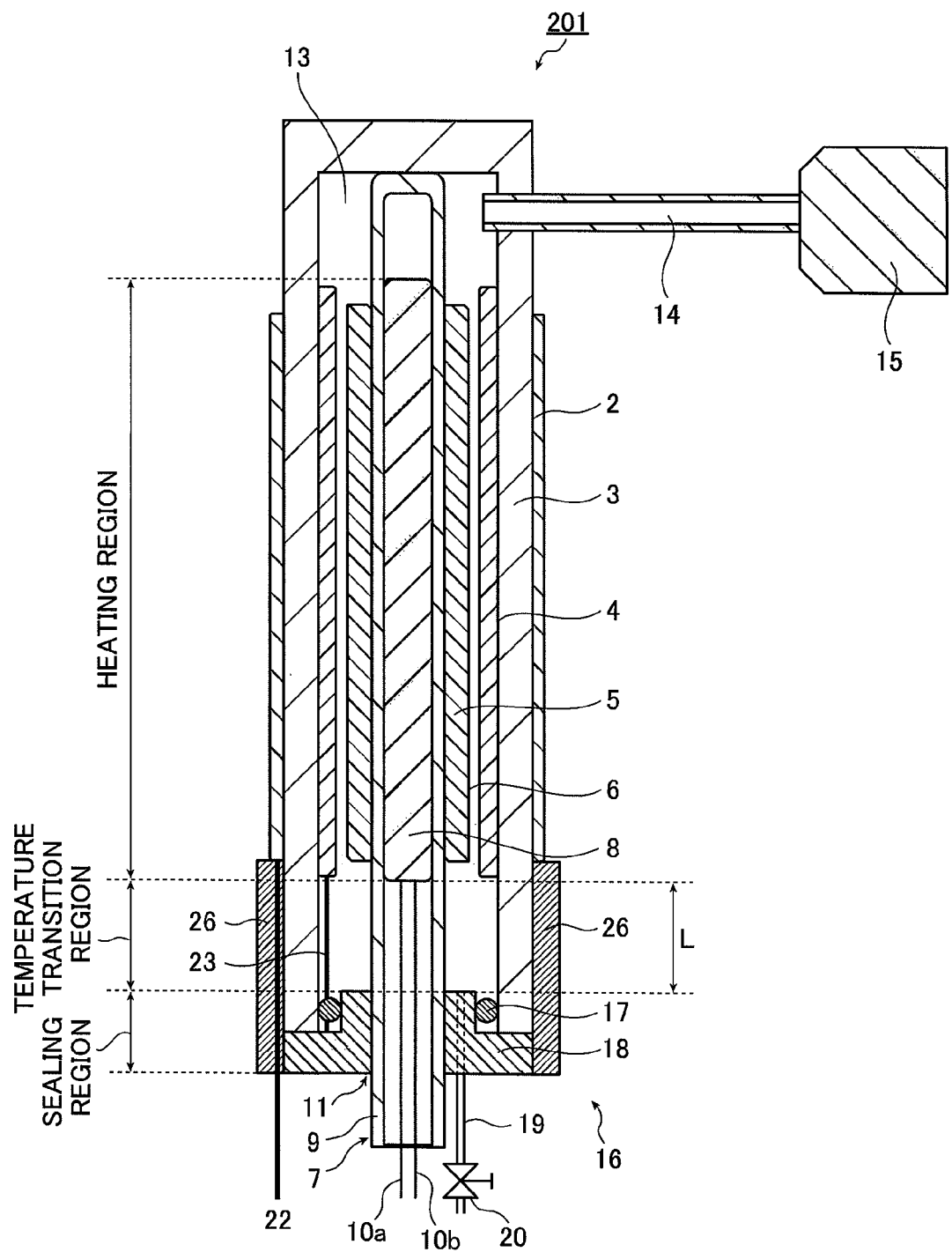
FIG. 5 is a view showing the entire constitution of a fuel cell according to a third embodiment of the present invention.

In the second embodiment, the heating portion 7 (particularly, the heating element 8) is separated from the sealing portion 16 by a predetermined distance L to form a space (temperature transition region), so as to improve the durability of the body of the fuel cell 101. As shown in FIG. 5, in addition to the constitution of the second embodiment, a thermal insulating material 26 may be installed in a fuel cell 201 so as to cover the solid electrolyte 3 that extends from the end of the cathode 2 (near the heating element 8 of the heating portion 7) to the sealing portion 16 at the other end of the solid electrolyte 3. In the solid electrolyte 3 of FIG. 5, the portion corresponding to the heating element 8 is a heating region, the portion from the end of the heating element 8 to the end of the sealing portion 16 is a temperature transition region, and the portion corresponding to the sealing portion 16 is a sealing region.

The thermal insulating material 26 is constituted with, for example, a ceramic compact, ceramics fiber, glass wool, or rock wool. In the present embodiment, the heating element 8 is put in a case made of SUS304 which is austenite-based stainless steel, but in order to further improve corrosion resistance, it may be put in an Inconel or a ceramic case. Further, the heating element 8 of the present embodiment has sheath-like thermocouple in the inside thereof, and accordingly, the temperature is precisely controllable in a simple manner.

Figure 6:
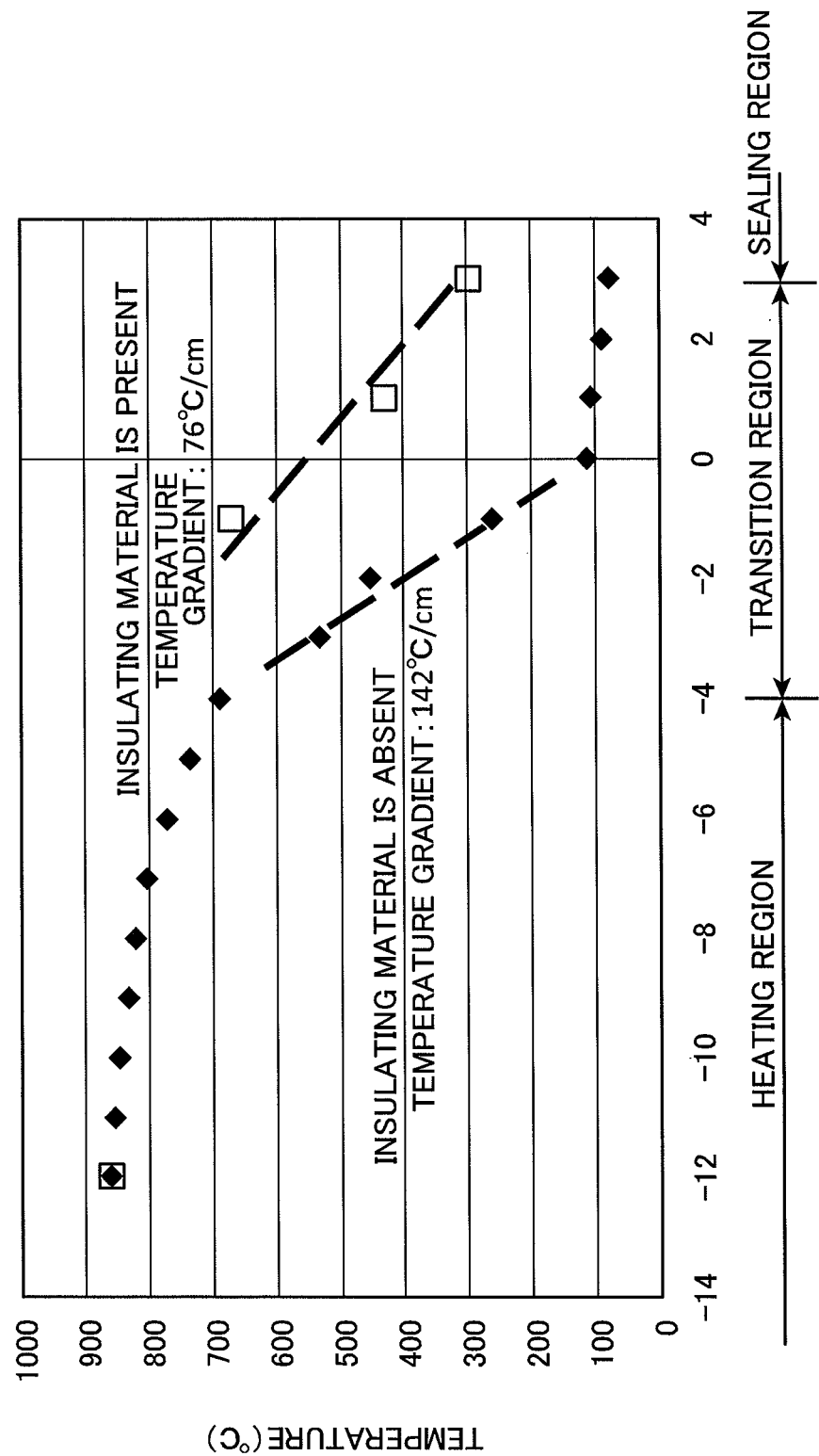
FIG. 6 is a graph for comparing a temperature gradient in a case where a thermal insulating material is installed in a temperature transition region with a temperature gradient in a case where it is not installed, in FIG. 5.

If the thermal insulating material 26 is provided so as to cover the solid electrolyte 3 that extends from the vicinity of the temperature transition region to the sealing region, the slope of a temperature gradient in the temperature transition region becomes gentle as shown in FIG. 6, and it is possible to sufficiently mitigate the thermal impact applied to the solid electrolyte 3 and to prevent cracking of the solid electrolyte 3.

Accordingly, compared to the second embodiment, the fuel cell 201 according to the third embodiment can prevent the cracking of the solid electrolyte 3 and maintain or improve a cycle life of the fuel cell, since the solid electrolyte 3 that extends from the heating portion 7 to the sealing portion 16 is protected with the thermal insulating material 26.

Figure 7:
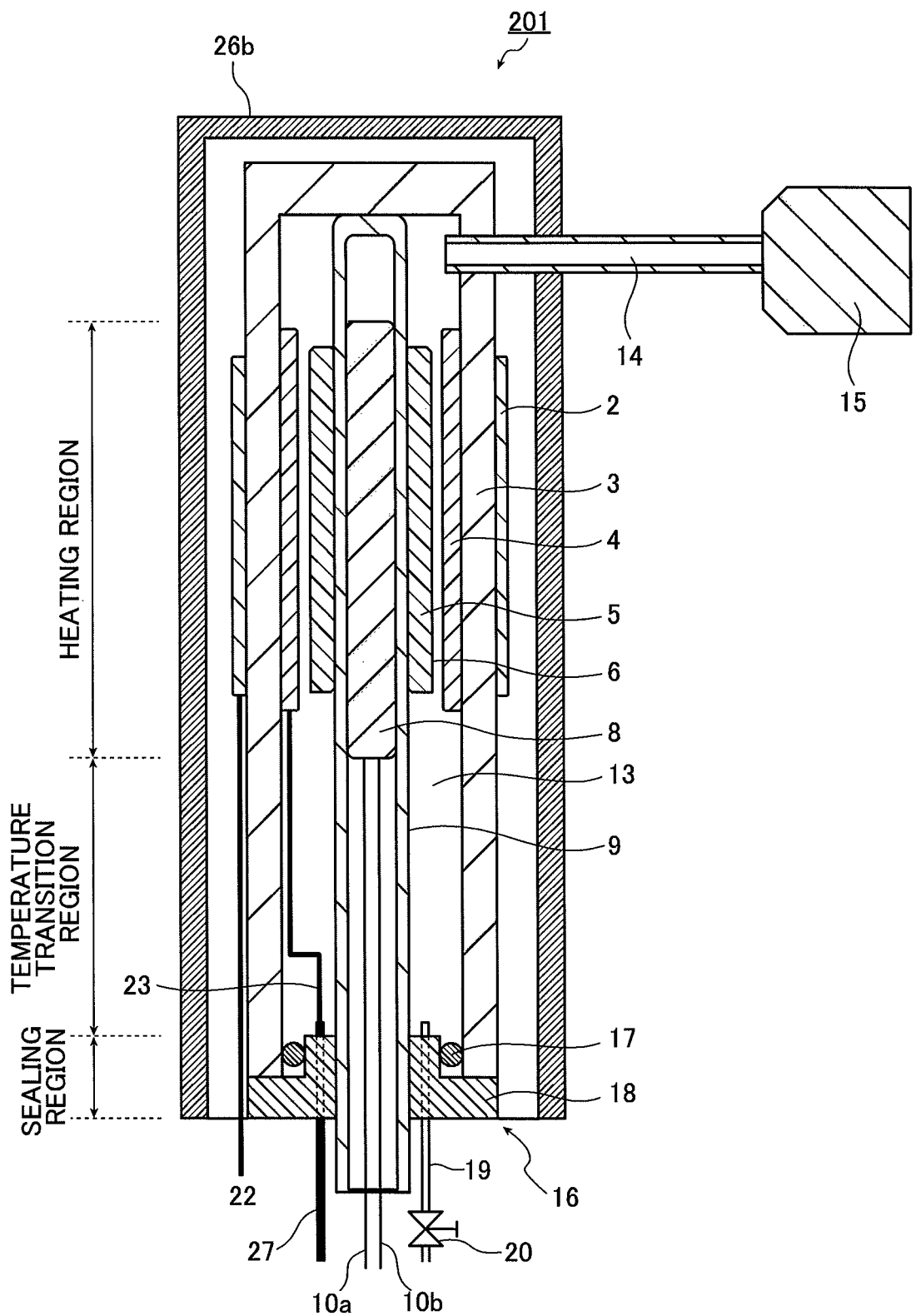
FIG. 7 is a view showing the entire constitution of a fuel cell according to a modified example of the third embodiment of the present invention.

In addition, as a modified example of the third embodiment, a thermal insulating material 26b can be disposed to cover the entire solid electrolyte 3, as shown in FIG. 7.

The fuel cells 1, 101, and 201 described above that include the heating portion 7 inside the solid electrolyte 3 have a thermal insulating material not shown in the drawings in a portion corresponding to the heating portion 7 of the solid electrolyte 3, so as to prevent cracking of the solid electrolyte 3 resulting from thermal impact caused by rapid temperature decrease that occurs when the solid electrolyte 3 comes into direct contact with the outside air. Therefore, the thermal insulating material corresponding to the heating portion 7 and not shown in the drawings may be connected to the thermal insulating material 26 extending from the vicinity of the temperature transition region to the sealing region to form the thermal insulating material 26b. In this case, the thermal insulating material not shown in the drawings and the thermal insulating material 26b have a constitution that allows oxygen to move throughout the cathode 2 that is in the surrounding of the solid electrolyte 3. Moreover, instead of connecting the anode current collector 23 to the sealing stopper 18 and using the sealing stopper 18 as an anode terminal, as shown in FIG. 7, an anode terminal 27 may be installed so as to penetrate the sealing stopper 18, and the anode terminal 27 may be airtightly fixed to the sealing stopper 18 by epoxy or the like.

If the thermal insulating material 26b is disposed in the entire area of the solid electrolyte 3, the temperature change in the portion corresponding to the heating portion 7 of the solid electrolyte 3 can be decreased, and the thermal impact applied to the solid electrolyte 3 can be mitigated. Therefore, cracking of the solid electrolyte 3 can be prevented.

Fourth Embodiment

In the first embodiment, heating is performed from the inside of the fuel cell, but it can be performed from the outside of the fuel cell.

Figure 8:
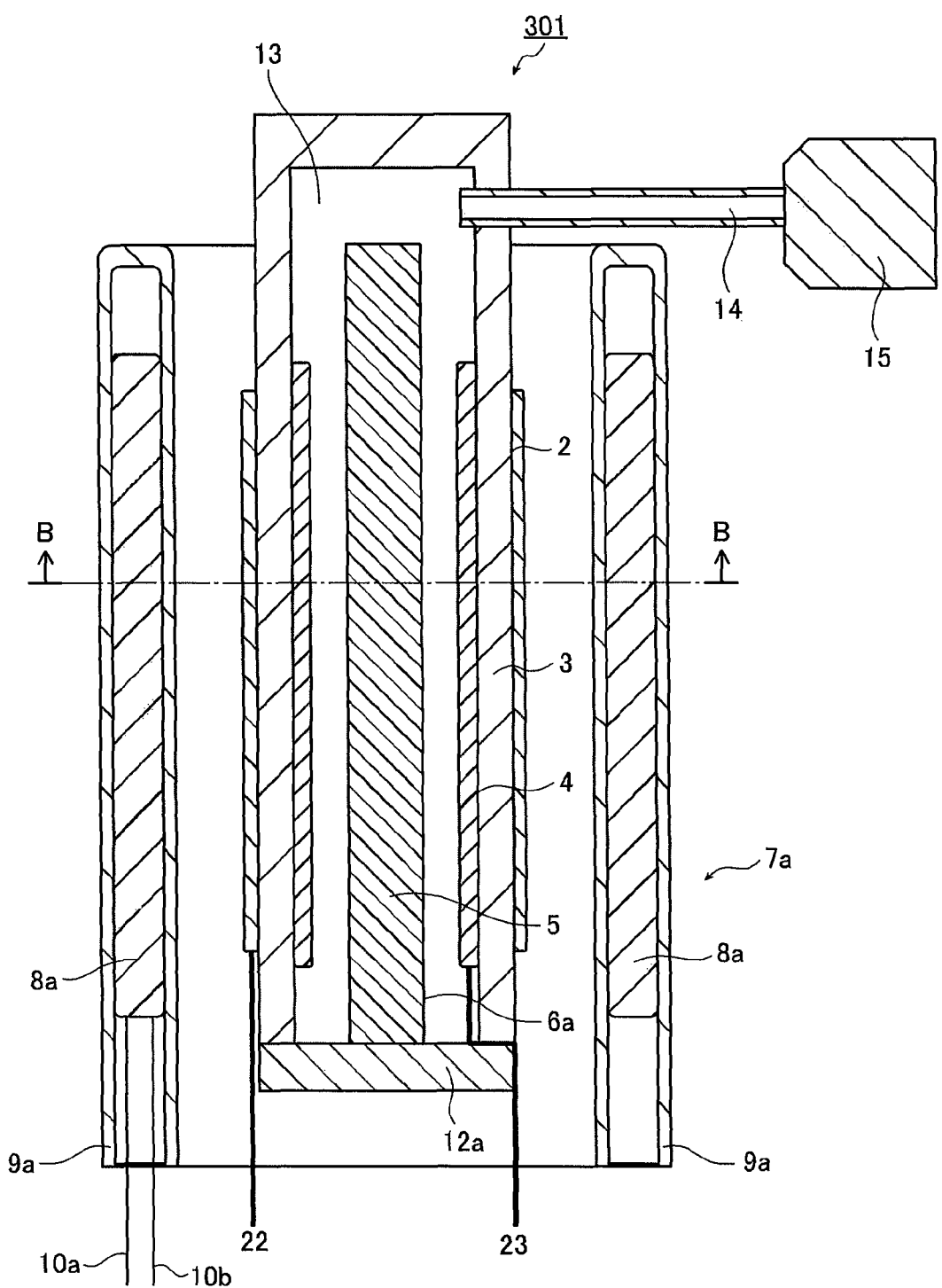
FIG. 8 is a view showing the entire constitution according to a fourth embodiment of the present invention.
Figure 9:
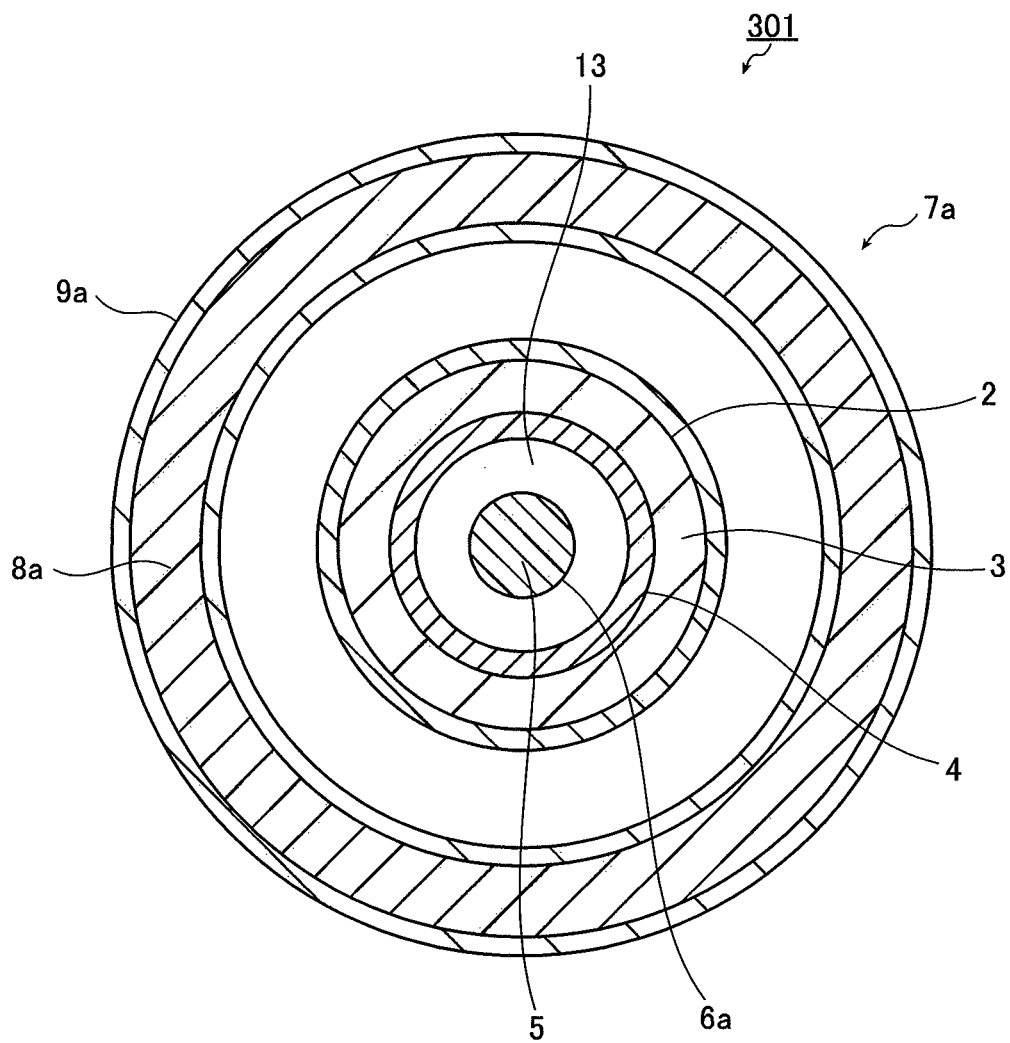
FIG. 9 is a transverse cross-sectional view of the fuel cell according to the fourth embodiment of the present invention.

FIG. 8 shows the entire constitution of a fuel cell 301 according to a fourth embodiment, and FIG. 9 shows a cross-sectional view obtained by cutting the fuel cell 301 shown in FIG. 8 along the B-B cross-section.

The constitution of the fourth embodiment differs from that of the first embodiment, in terms of the shape and disposition of the anode fuel material 5 and an anode fuel case 6a, the shape and disposition of a heating portion 7a, and the shape of a cap 12a.

As shown in FIGS. 8 and 9, in the fourth embodiment, the heating portion 7a having a doughnut shape is disposed around the cathode 2 so as to cylindrically surround the cathode 2. Moreover, the cylindrical anode fuel case 6a including the anode fuel material 5 extends from the cap 12a, and the anode fuel material 5 is disposed in the center of the sealed space 13. The cap 12a does not have the through-hole 11 and seals the sealed space 13 by being airtightly joined to the end of the cylindrical solid electrolyte 3.

In the fuel cell 301 according to the fourth embodiment, the heating portion 7a, which generates heat by being supplied with power, heats the cathode 2, the solid electrolyte 3, the anode 4, and the anode fuel material 5 that are installed in the inside thereof. Therefore, similarly to the first embodiment, a volume energy density of the cell can be increased, and accordingly, the fuel cell itself can be miniaturized just like the first embodiment.

Fifth Embodiment

In the first and fourth embodiments, the other end of the cylindrical solid electrolyte 3 of which one end has been closed is sealed by the cap 12 or the cap 12a, whereby the sealed space 13 in which the anode 4 and the anode fuel material 5 are sealed is formed.

Moreover, in the first and fourth embodiments, the fuel cell 1 or the fuel cell 301 is (the cathode 2, the solid electrolyte 3, the anode 4, and the anode fuel material 5 are)

heated by the heating portion 7 or the heating portion 7a up to about 850° C. to 1,000° C. at the time of generating power. Accordingly, the sealed state of the sealed space 13 cannot be sufficiently maintained by a sealing portion that can be simply opened or closed.

Consequently, for example, in the first and fourth embodiments, if the sealed space 13 is sealed by a sealing portion premised on the replacement of the anode fuel material 5, the space is not sufficiently sealed, so a life of the fuel cell is shortened.

Figure 10:
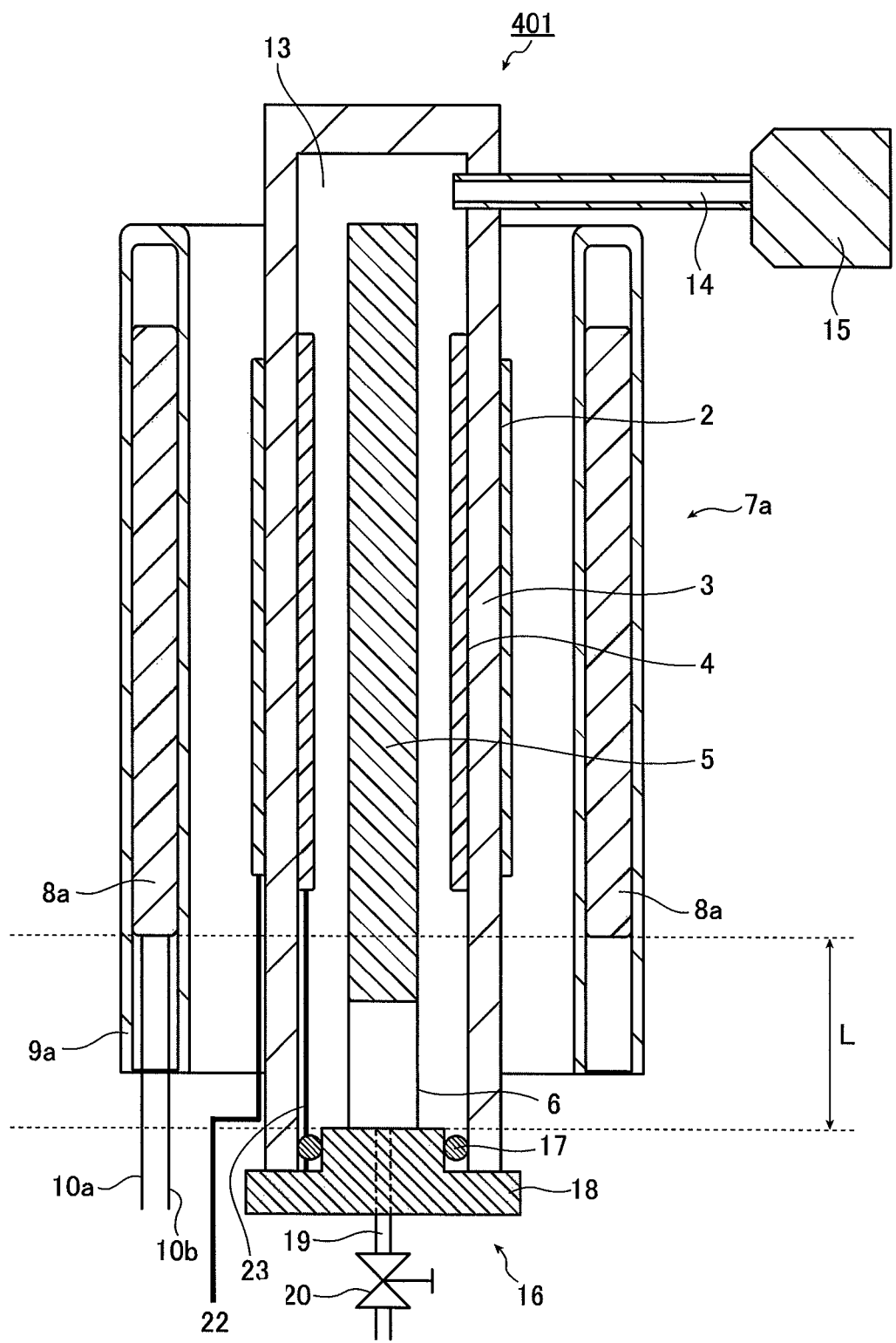
FIG. 10 is a view showing the entire constitution of a fuel cell according to a fifth embodiment of the present invention.

A fuel cell 401 according to the fifth embodiment has been made as a countermeasure for the sealing means described above similarly to the second embodiment. FIG. 10 is a view showing the entire constitution of the fuel cell 401 according to the fifth embodiment. The constitution of the fifth embodiment differs from that of the fourth embodiment, in terms of the constitution of the sealing portion 16 that seals the cylindrical solid electrolyte 3.

As shown in FIG. 10, the cylindrical solid electrolyte 3 of the fuel cell 401 forms a long and slender shape, and the portion of a heating element 8a of the heating portion 7a is separated from the sealing portion 16 at the other end of the solid electrolyte 3 by a sufficient distance L to form a space (temperature transition region) indicated by dotted lines.

Moreover, the sealing portion 16 is composed of the O-ring 17 and the sealing stopper 18 made of a metal, and the supply path 19 and the valve 20 are installed in the sealing stopper 18. The O-ring 17 is constituted with heat-resistant silicone rubber or the like and seals the space between the sealing stopper 18 and the cylindrical solid electrolyte 3. In order to sufficiently seal the space, an adhesive such as ceramic paste may be used at the same time.

In the state where discharge has not yet been performed, reducing gas fills up the sealed space 13 where the anode 4 and the anode fuel material 5 are present. The reducing gas is supplied through the supply path 19 passing through the sealing stopper 18 and the valve 20, and at the time of operation (discharge), the valve is closed to form a closed space.

The reducing gas is not particularly limited as long as it is redox gas, and examples thereof include hydrogen, carbon monoxide, nitrogen monoxide, and a mixed gas of these. By the reaction at the time of discharge, the reducing gas is oxidized at the anode 4 and turns into oxidation gas. The oxidation gas reacts with the anode fuel material 5, whereby reducing gas and an oxide of the anode fuel material are formed. This reaction continues until the reaction between the oxidation gas and the anode fuel material stops. The gas injected into the sealed space may not be reducing gas and may be oxidation gas.

In the fuel cell 401 according to the fifth embodiment, the sealed space 13 is sealed by the sealing portion 16 composed of the O-ring 17 and the sealing stopper 18. Since the sealing portion 16 is easily detachable, the anode fuel material 5 having undergone the reaction can be simply replaced.

If the temperature reaches 350° C. or higher, the sealing properties of the sealing portion 16 markedly deteriorate, so the temperature of the sealing portion 16 needs to be kept at lower than 350° C.

The following Table 1 shows the relationship among the temperature gradient from the heating portion 7a (particularly, the heating element 8a) to the sealing portion 16, the presence or absence of the pressure-absorbing portion 15, and the cycle life of the fuel cell, which is obtained from the fuel cell 401 by experiments.

Similarly to Example 1 described later, the fuel cell 401 is constituted with a solid electrolyte that is obtained by installing a cathode and an anode in an yttria-stabilized zirconia protection tube having an outer diameter of 12.7 mm, an inner diameter of 9.5 mm, and a length of 300 mm. In this fuel cell, a thermocouple is installed on the surface of the solid electrolyte to measure a temperature gradient from the heating portion 7a to the end of the sealing portion 16.

The fuel cells A to D shown in Tabled are different from one another, in terms of the distance L for the space (temperature transition region) between the heating portion 7a and the sealing portion 16 and the presence or absence of the pressure-absorbing portion 15.

TABLE 1

|  | Temperature gradient | Presence or absence of pressure-absorbing portion | Cycle life |
| --- | --- | --- | --- |
| Fuel cell A | 200° C./cm | Absent | 20 times |
| Fuel cell B | 150° C./cm | Absent | 200 times |
| Fuel cell C | 100° C./cm | Absent | 500 times |
| Fuel cell D | 100° C./cm | Present | 1000 times |

By the heat generated by the heating element composed of electric heating wires or the like, the heating portion 7a (and the heating element 8a) are heated up to about 850° C. to 1,000° C., and the sealing portion 16 needs to be kept at 300° C. or a lower temperature. Accordingly, the temperature gradient can be calculated as 550 to 700(° C.)/L (cm).

Therefore, according to Table 1, when the heating portion 7 is kept at a temperature of about 1,000° C., the distance L between the heating element 8 and the sealing portion 16 is preferably 7.0 cm or longer such that the temperature gradient becomes about 100° C./cm.

In the fifth embodiment, similarly to the second embodiment, the fuel cell 401 includes the sealing portion 16 composed of the O-ring 17 and the sealing stopper 18 as described above. Accordingly, if the sealing portion 16 is opened to remove the anode fuel material 5, which has been oxidized by reacting with the oxidation gas, from the sealed space 13, an unused anode fuel material 5 is newly installed in the anode fuel case 6, and the sealing portion 16 is closed, thereby the oxidized anode fuel material 5 can be replaced with the unused anode fuel material 5.

When it is desired to shorten the time taken for charging the fuel cell of the present invention, simply by replacing the anode fuel material 5 and supplying oxidation gas, reducing gas can be newly obtained. That is, so-called quick charge becomes feasible. In order to facilitate the replacement and replenishing of the anode fuel material 5, it is preferable that the anode fuel case 6 accommodating the anode fuel material 5 be, for example, a container made of ceramics, a resin, or a metal that is perforated or is porous or has a shape of bag.

At the time of replacing the anode fuel material 5, the reducing gas, the oxidation gas, and the unreacted anode fuel material 5 are present as being mixed in the anode fuel case 6. Accordingly, when the gas such as hydrogen having a wide explosion range is used as the reducing gas, if the anode fuel case 6 is opened to the outside as is, there is a possibility that the outside oxygen may react with the reducing gas and explode. In order to avoid such a risk, for example, it is desirable to inject inert fluid such as fluorinated oil into the anode fuel case 6 to cover and cool the anode fuel material 5 in the anode fuel case 6 with the inert fluid, and then open the case in an open space.

Sixth Embodiment

Figure 11:
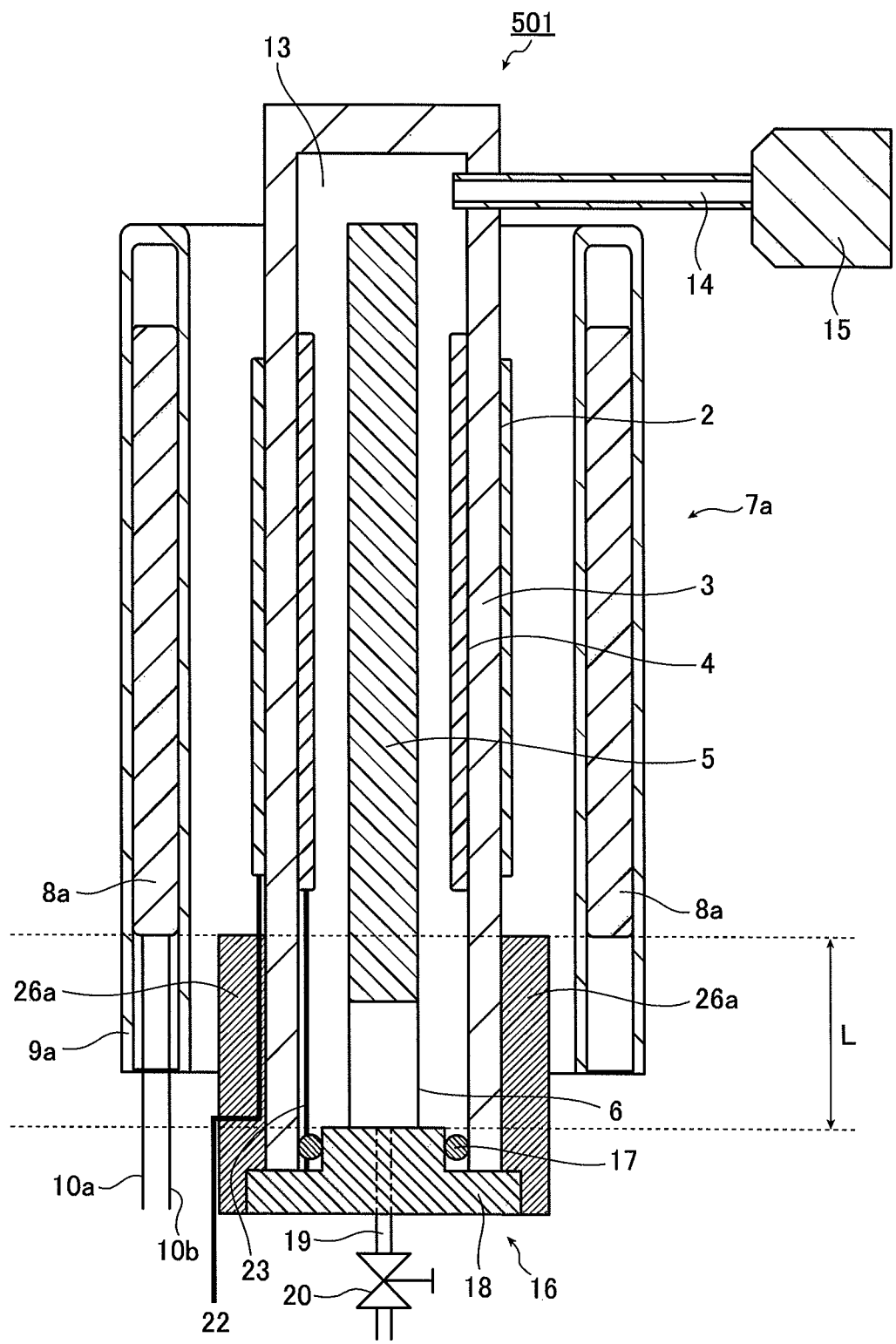
FIG. 11 is a view showing the entire constitution of a fuel cell according to a sixth embodiment of the present invention.

In the fifth embodiment, the heating portion 7*a* (particularly, the heating element 8*a*) is separated from the sealing portion 16 by a predetermined distance L to improve the durability of the body of the fuel cell 101. In addition to the constitution of the fifth embodiment, similarly to the third embodiment, a thermal insulating material 26*a* may be installed in a fuel cell 501 as shown in FIG. 11. The thermal insulating material 26*a* is installed in the portion (temperature transition region) of the solid electrolyte 3 between the heating element 8*a* of the heating portion 7*a* and the sealing portion 16 at the other end of the solid electrolyte 3 that is indicated by the dotted lines. It is preferable that the thermal insulating material 26*a* also cover the portion of the solid electrolyte 3 corresponding to the sealing portion 16 as shown in FIG. 11.

The thermal insulating material 26*a* is constituted with, for example, glass wool or rock wool. If the thermal insulating material 26*a* is provided to the portion of the solid electrolyte 3 between the heating element 8*a* and the sealing portion 16 at the other end of the solid electrolyte 3, cracking of the solid electrolyte 3 caused by thermal impact can be prevented, and the distance L between the heating portion 7*a* (particularly, heating element 8*a*) and the sealing portion 16 can be more shortened than in the fifth embodiment.

Consequently, compared to the fifth embodiment, the fuel cell 501 according to the sixth embodiment can prevent cracking of the solid electrolyte 3, and the fuel cell itself can become further compact while maintaining or increasing a cycle life of the fuel cell, since the solid electrolyte 3 between the heating portion 7*a* and the sealing portion 16 is protected with the thermal insulating material 26*a*.

Seventh Embodiment

In the first to sixth embodiments, one end of the cylindrical solid electrolyte 3 is blocked, the other end thereof is opened, and the solid electrolyte 3 is sealed by the cap 12 or the cap 12*a*, or the sealing portion 16. However, a constitution may be employed in which both ends of the cylindrical solid electrolyte are opened, and each of both the ends is sealed by the cap 12 or the cap 12*a*, or the sealing portion 16.

Figure 12:
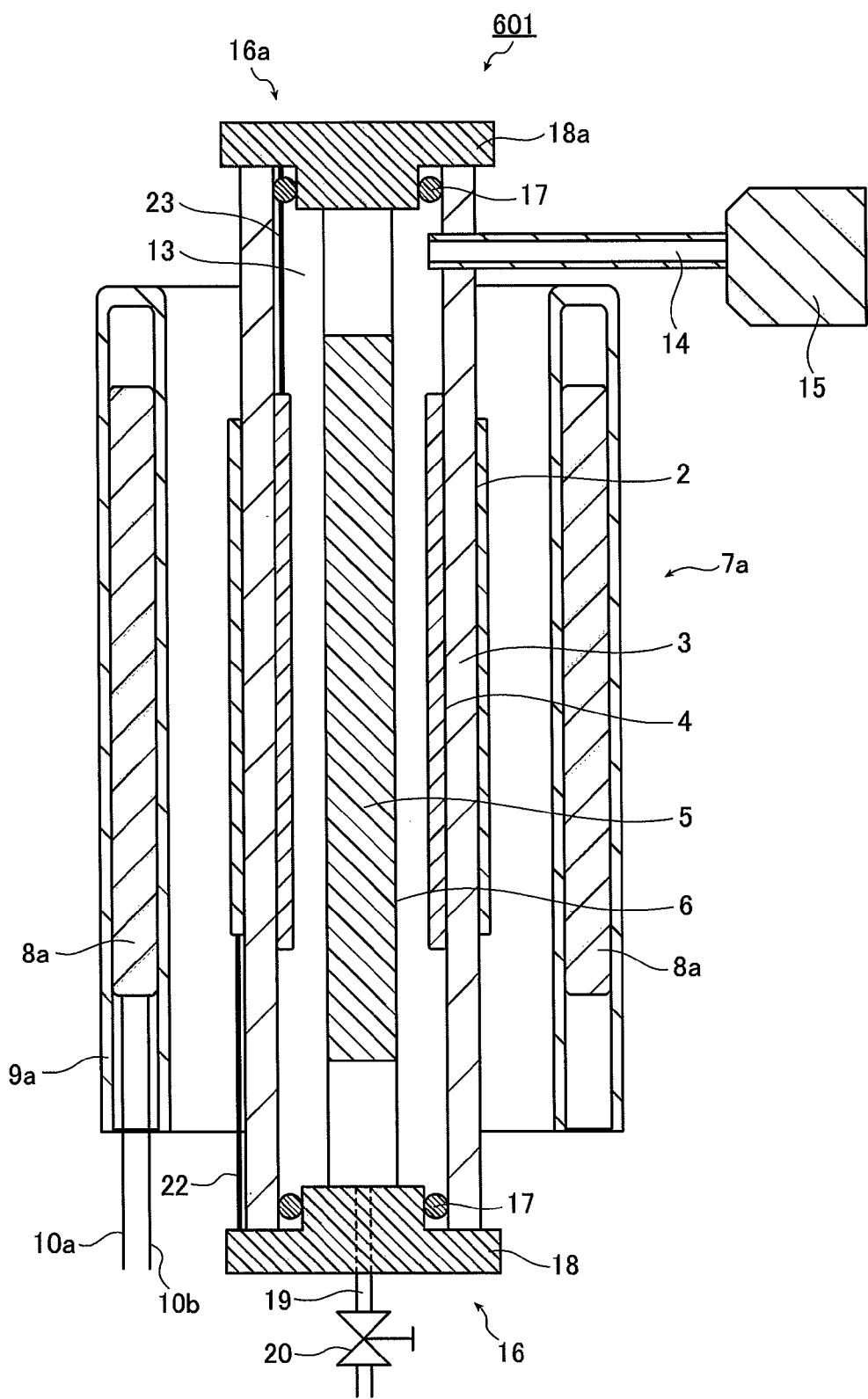
FIG. 12 is a view showing the entire constitution of a fuel cell according to a seventh embodiment of the present invention.

For example, as shown in FIG. 12, one end of a fuel cell 601 is provided with a sealing portion 16*a* which is sufficiently apart from the heating portion 7*a* and sealed by the O-ring 17 and a sealing stopper 18*a*. Moreover, the other end of the fuel cell is also provided with a sealing portion 16 which is sufficiently apart from the heating portion 7*a* and sealed by the O-ring 17 and the sealing stopper 18. Similarly to the third embodiment, in the sealing portion 16 at the other end of the fuel cell, the supply path 19 penetrating the sealing stopper 18 and the valve 20 are installed.

In the fuel cell 601 according to the seventh embodiment, both ends thereof can be opened. Accordingly, the anode fuel material 5 having undergone the reaction can be more simply replaced.

Eighth Embodiment

Figure 13:
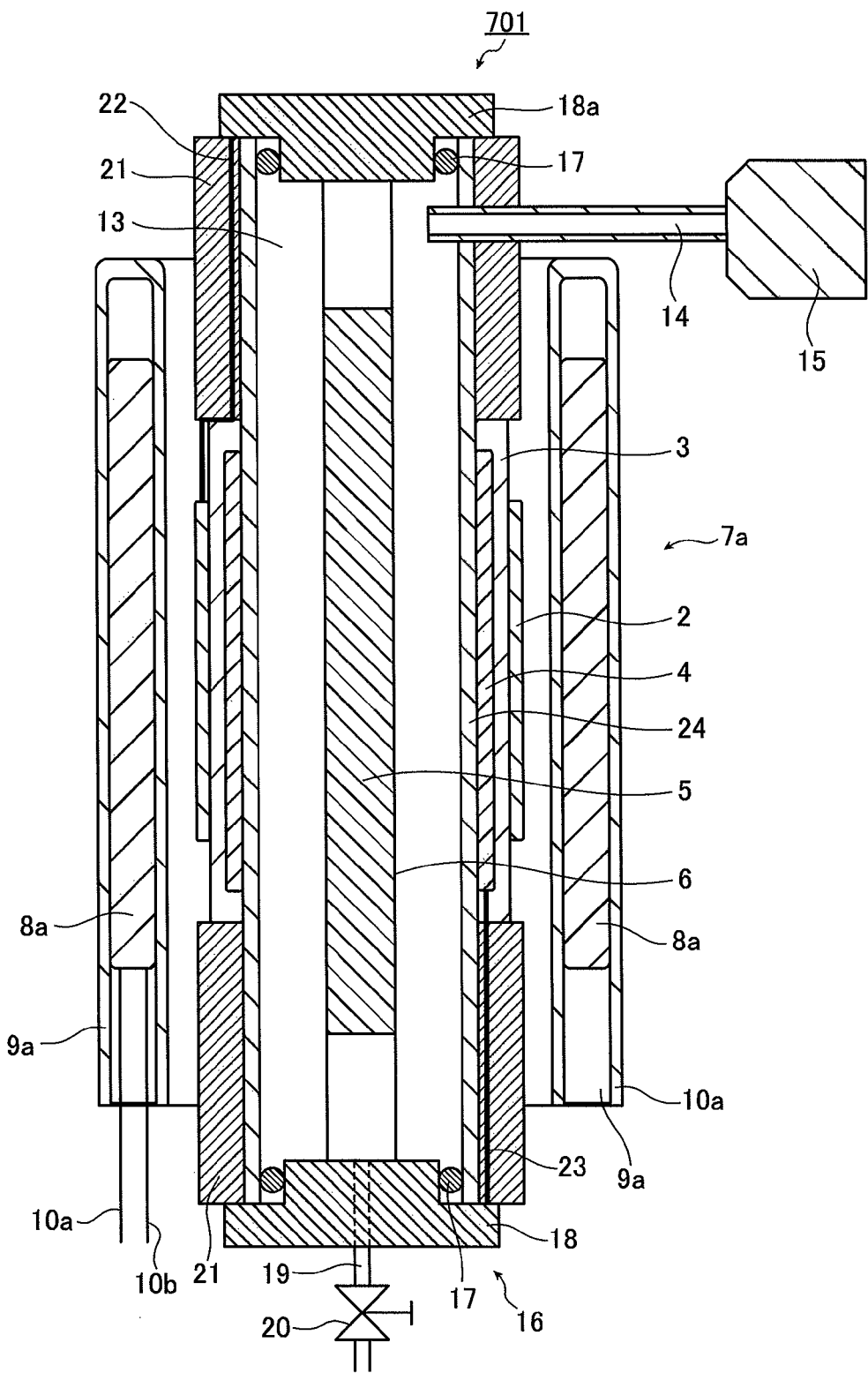
FIG. 13 is a view showing the entire constitution of a fuel cell according to an eighth embodiment of the present invention.

In addition, for example, as shown in FIG. 13, a sealing material 21 may be used to form the sealed space 13 in a fuel cell 701.

As shown in FIG. 13, the fuel cell 701 according to the eighth embodiment includes a porous ceramic tube 24 having a hollow cylindrical shape. On the surface of the porous ceramic tube 24, the cylindrical anode 4, the cylindrical solid electrolyte 3, and the cylindrical cathode 2 are disposed in this order. The outer surface of the anode 4 is completely covered with the solid electrolyte 3.

The solid electrolyte 3 has airtightness that does not allow fuel gas or air to permeate. Further, the solid electrolyte 3 shown in FIG. 13 is formed into a thin film shape.

Both ends of the porous ceramic tube 24 are sealed by the sealing portions 16 and 16*a* composed of the O-rings 17 and the sealing stoppers 18 and 18*a* made of a metal. The portions of the porous ceramic tube 24 between the sealing stoppers 18 and 18*a* and the solid electrolyte 3 are coated with the sealing material 21, and accordingly, the sealed space 13 is formed inside the porous ceramic tube 24.

It is preferable that the sealing material 21 also play a role of a thermal insulating layer that makes the temperature gradient gentle. If the sealing material 21 is provided, the distances L between the heating portion 7*a* and the sealing portions 16 and 16*a* can be shortened, and the fuel cell itself can become compact.

The cathode current collector 22 and the anode current collector 23 are connected to the cathode 2 and the anode 4, respectively. In addition, the cathode current collector 22 and the anode current collector 23 penetrate the sealing material 21 and are connected to the sealing stopper 18*a* at one side and the sealing stopper 18 at the other side, respectively. Accordingly, the two sealing stoppers 18 and 18*a* are usable as an anode terminal and a cathode terminal of the fuel cell.

In the fuel cell 701 according to the eighth embodiment, the periphery of the anode current collector 23 penetrating the solid electrolyte 3 is maintained in an airtight state by the sealing material 21. Therefore, the airtight state of the sealed space 13 is more reliably maintained than in the fuel cell 601 of the seventh embodiment.

Moreover, in the fuel cell 701 of the eighth embodiment, the solid electrolyte 3 can be formed more thinly than in the first to seventh embodiments. Consequently, it is possible to improve the permeability of oxygen ions and to improve the power-generating ability of the fuel cell.

Ninth Embodiment

Figure 14:
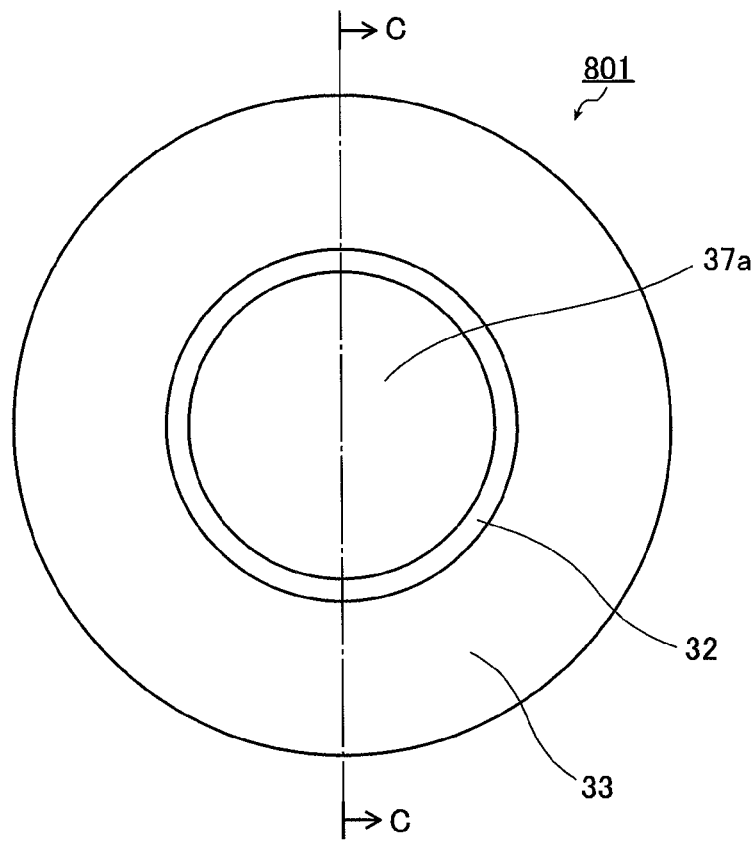
FIG. 14 is a plan view of a fuel cell according to a ninth embodiment of the present invention.
Figure 15:
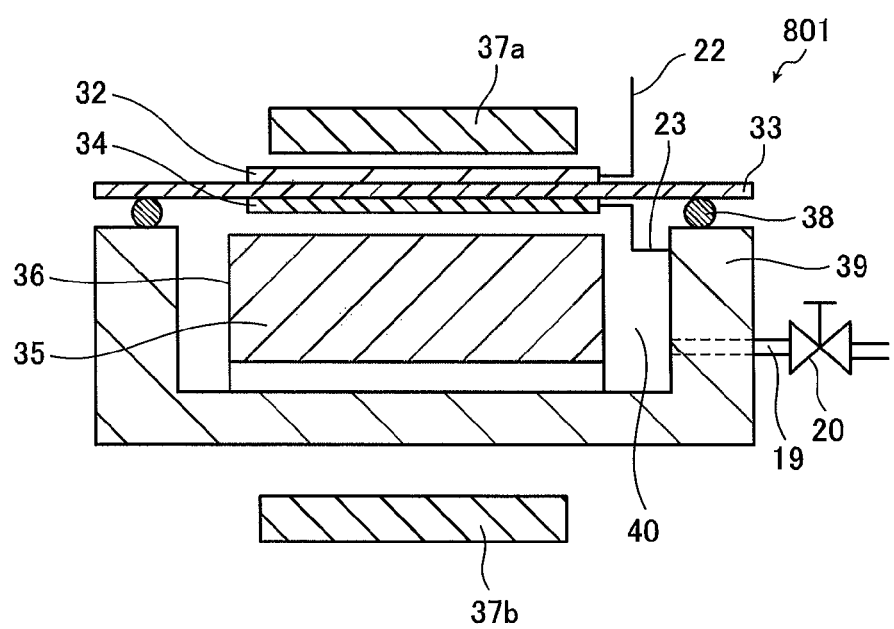
FIG. 15 is a cross-sectional view showing the entire constitution of a fuel cell according to the ninth embodiment of the present invention.

FIG. 14 is a drawing of a fuel cell 801 according to the ninth embodiment that is viewed from right above, and FIG. 15 is a cross-sectional view of the fuel cell 801 according to the ninth embodiment that is viewed directly from a side thereof.

In FIGS. 14 and 15, the fuel cell portion is constituted with a cathode 32, a solid electrolyte 33, an anode 34, the anode fuel material 35, and an anode case 36. By the solid electrolyte 33, an O-ring 38, and a fuel cell case 39, the anode 34, the anode fuel material 35, and the anode case 36 are sealed. Moreover, a heating portion 37*a* is installed in the position above the cathode 32, and a heating portion 37*b* is installed in the portion below the fuel cell case 39, respectively. The fuel cell case 39 is a metal case composed of a bottom surface portion and a wall surface portion. A supply path 19 is disposed in the wall surface portion, and a valve 20 is disposed on the supply path 19. Through the valve 20 and the supply path 19, reducing gas is supplied into a sealed space 40 where the anode fuel material 35 is present. A cathode current collector 22 is lead out of the cathode 32 and used as a cathode terminal, and an anode current collector 23 is lead out of the anode 34 and connected to the fuel cell case 39. The fuel cell case 39 is used as an anode terminal.

The operation of the fuel cell 801 according to the ninth embodiment is the same as in the first to eighth embodiments.

Tenth Embodiment

The fuel cell may include one more fuel cell portion instead of the fuel cell case 39 of the ninth embodiment.

Figure 16:
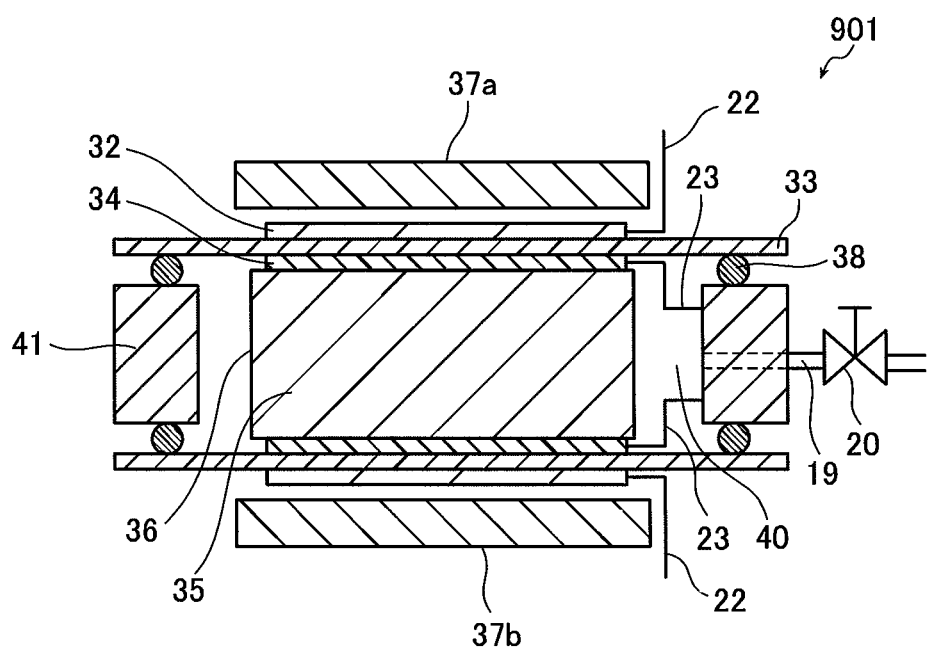
FIG. 16 is a view showing the entire constitution of a fuel cell according to a tenth embodiment of the present invention.

As shown in FIG. 16, a fuel cell 901 according to a tenth embodiment includes fuel cell portions composed of the cathode 32, the solid electrolyte 33, and the anode 34 in vertically symmetrical positions. By two solid electrolytes 33, a cylindrical case 41, and two O-rings 38, the sealed space 40 is formed. In the sealed space 40, two anodes 34, an anode fuel material 35, and an anode case 36 are disposed. Moreover, the heating portions 37a and 37b are disposed respectively so as to hold two cathodes 32 therebetween from the top and bottom. The cylindrical case 41 is provided with a supply path 19 in the wall surface portion, and a valve 20 is disposed on the supply path 19. Through the valve 20 and the supply path 19, reducing gas is supplied into the sealed space 40 where the anode material 35 is present.

Cathode current collectors 22 are lead out of the cathodes 32 respectively and used as cathode terminals. Anode current collectors 23 are lead out of the anodes 34 respectively and connected to the cylindrical case 41, and the cylindrical case 41 is used as anode terminal. Accordingly, the fuel cell 901 has a constitution in which two fuel cell portions are connected to each other in parallel. The fuel cell may also have a constitution in which at least one of the anode current collectors 23 is not connected to the cylindrical case 41.

The operation of the fuel cell 901 according to the tenth embodiment is the same as in the first to ninth embodiments.

Eleventh Embodiment

Figure 17:
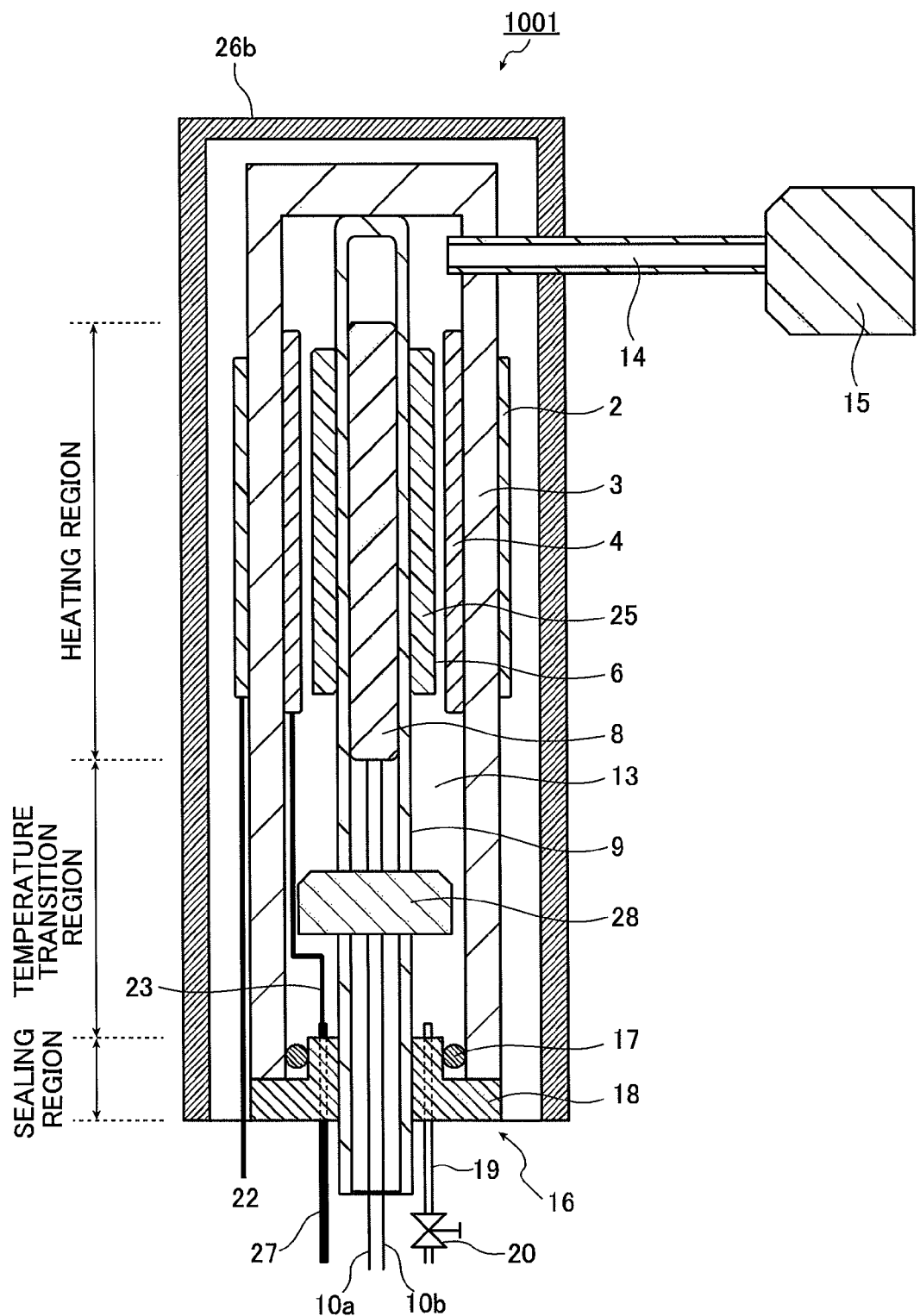
FIG. 17 is a view showing the entire constitution of a fuel cell according to an eleventh embodiment of the present invention.

Unlike the first to tenth embodiments, a fuel cell 1001 according to an eleventh embodiment shown in FIG. 17 uses, as an anode fuel material 25, a substance which is easily obtainable as household waste or industrial waste such as solid or liquid organic compounds including plastics, carbohydrates and fiber scrap, general metal scrap or the like, and water. The pressure-absorbing portion 15 and a gas absorber 28 may be optionally installed.

Figure 18A:
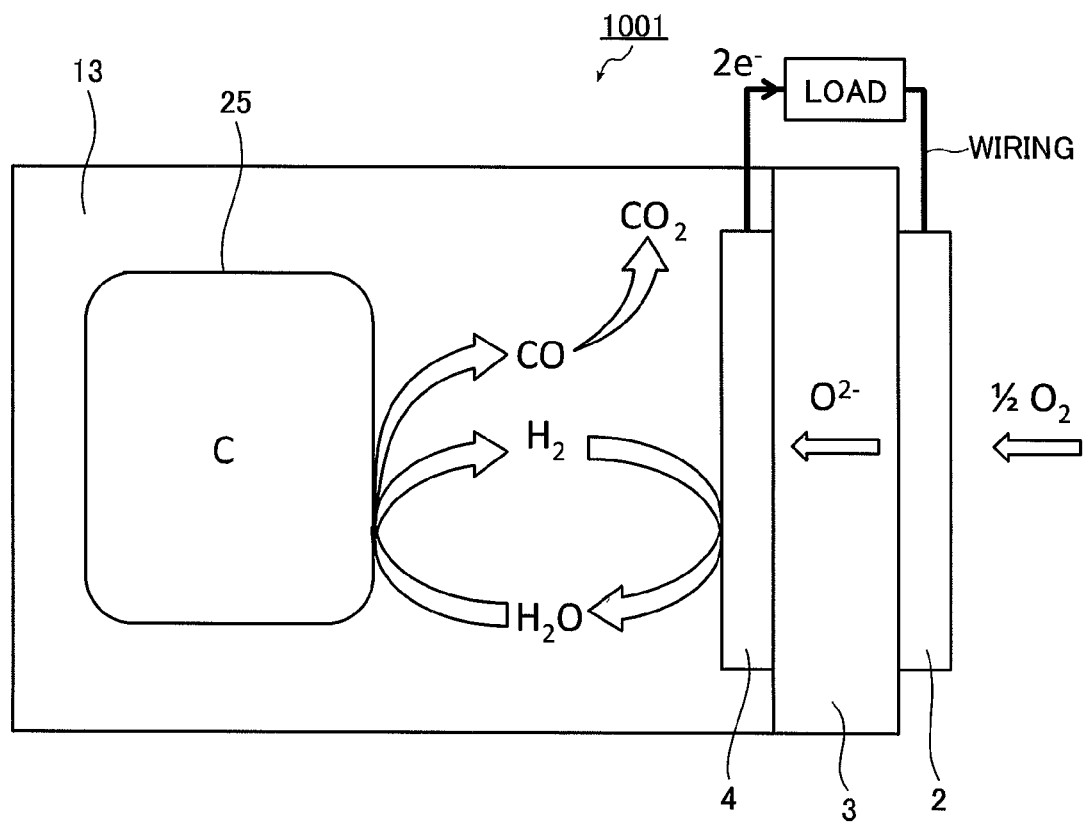
FIG. 18A is a view for illustrating the operation of the fuel cell according to the eleventh embodiment of the present invention.

FIG. 18A is a view schematically showing the operation of the fuel cell 1001 according to the eleventh embodiment.

The fuel cell 1001 includes the cathode 2, the solid electrolyte 3, the anode 4, and the anode fuel material 25. The cathode 2, the solid electrolyte 3, and the anode 4 are closely contacted and connected to one another, and the anode 4 and the anode fuel material 25 are installed inside the sealed space 13 formed by the solid electrolyte 3.

The fuel cell 1001 needs to be constituted to discharge carbon dioxide which is generated at the time of power generation. Accordingly, as shown in FIG. 17, this fuel cell has a constituent for discharging or absorbing carbon dioxide such as the pressure-absorbing portion 15 made of a bellows, a diaphragm, a balloon, or the like connected to the connection path 14, or the gas absorber 28 made of an alkaline compound, or a liquid valve (pipe or the like put in liquid).

When the cathode 2, the solid electrolyte 3, the anode 4, and the anode fuel material 25 are heated by the heating portion 7 not shown in FIG. 18A to a temperature exceeding 300° C. (preferably 850° C. to 1,000° C.), an organic solid compound is carbonized by reacting with water vapor of a high temperature under an oxygen-free atmosphere and becomes carbon (C). As a result, a chemical reaction in which carbon (C) reacts with water (water vapor: $H_2O$) to produce carbon monoxide (CO), carbon dioxide ($CO_2$), and hydrogen ($H_2$) occurs. Simultaneously, in the fuel cell portion, a fuel cell reaction occurs in which the outside oxygen (½ $O_2$) is ionized at the cathode 2, the oxygen ions ($O^{2-}$) having moved from the cathode 2 to the anode 4 inside the solid electrolyte 3 react with carbon monoxide (CO), which is generated from the anode fuel material 25, and become carbon dioxide ($CO_2$), and $CO_2$ reacts with hydrogen ($H_2$) to produce water ($H_2O$). This fuel cell reaction is one of the reactions considered to occur inside the fuel cell 1001, and the details thereof have not been clarified.

When a solid or liquid organic compound such as plastic or fiber is used as the anode fuel material 25, due to a carbonizing reaction of organic compound and a chemical reaction following thereto, fuel gas such as hydrogen gas or carbon monoxide gas is generated, and accordingly, a fuel cell reaction (discharge reaction) occurs. Moreover, if metal scrap or the like is mixed with the anode fuel material 25, water is reduced by the metal due to the highly increased temperature, and hydrogen gas is generated. Therefore, a fuel cell reaction also occurs in this case. Water ($H_2O$) generated by the fuel cell reaction reacts again with the anode fuel material 25 as water vapor to regenerate fuel gas. This circulating reaction can be continued unless the anode fuel material 25 cannot be oxidized any more, and thus, the fuel cell 1001 can discharge unless the anode fuel material 25 cannot be oxidized any more.

Figure 18B:
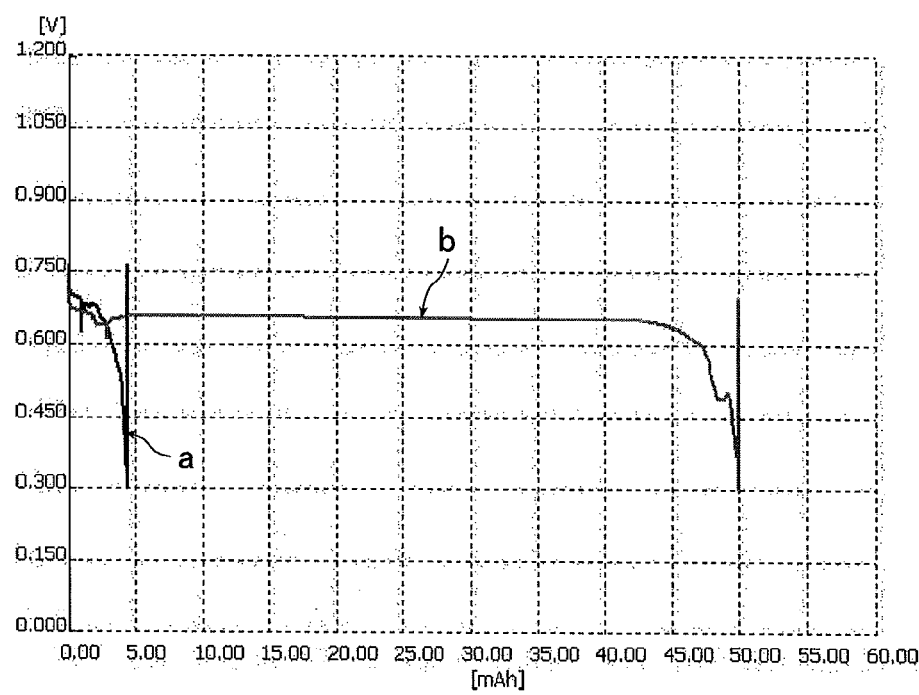
FIG. 18B is a graph showing discharge properties according to the eleventh embodiment of the present invention.

FIG. 18B shows the discharge properties of such a novel fuel cell using a solid or liquid organic compound and water as the anode fuel material. In FIG. 18B, banana peels are used as the anode fuel material 25. The graph a in FIG. 18B shows a discharge curve in a comparative example of not using banana peels, and the graph b in FIG. 18B is a discharge curve in a case of using 20 mg of banana peels. In these examples, the fuel cell is initially filled with 5% hydrogen-95% argon gas, and then discharge is started. Accordingly, even when the banana peels are not used, a current of about 4.5 mAh can be discharged since the originally present hydrogen gas is consumed. However, when there are banana peels, a current of about 50 mAh or more can be discharged.

From the graph of FIG. 18B, it is considered that in the fuel cell 1001, (1) a first reaction may occur in which a solid organic substance reacts with hydrogen gas under an oxygen-free atmosphere to produce solid-state carbon and water vapor, (2) a second reaction may occur in which the produced solid-state carbon reacts with water vapor at a high temperature under an oxygen-free atmosphere to produce carbon monoxide, carbon dioxide, and hydrogen gas, and (3) a power generation reaction may occur in which the thus generated fuel gas such as carbon monoxide or hydrogen gas reacts with oxygen ions at the anode to produce electrons, water vapor, and carbon dioxide.

As described above, it was understood that according to the present invention, direct power generation using household waste becomes feasible.

In charging, the reverse reaction occurs in the anode fuel material 25 and the anode 4, carbon dioxide ($CO_2$) is consumed, and carbon (C) is deposited. Since the deposited carbon (C) hinders a chemical reaction on the surface of the anode 4 by covering the surface of the anode 4, this fuel cell is therefore temporarily usable as a secondary battery, but is inappropriate for repetitive use.

As described above, in the fuel cell 1001 according to the eleventh embodiment, heating is performed from the inside the fuel cell, so a volume energy density of the cell can be increased. Accordingly, the fuel cell itself can be miniaturized.

Furthermore, the fuel cell 1001 uses carbon for the power generation reaction. Since carbon is generated by heating an organic compound with water at a high temperature, if waste and unnecessaries of organic compounds such as leftover foods or chaff are put into the cell as the anode fuel material 25, it is possible to instantly use them as useful energy sources without performing pre-treatment and the like.

Twelfth Embodiment

In the eleventh embodiment, one fuel cell 1001 is described. However, a plurality of the fuel cell portions according to the eleventh embodiment may be provided.

Figure 19A:
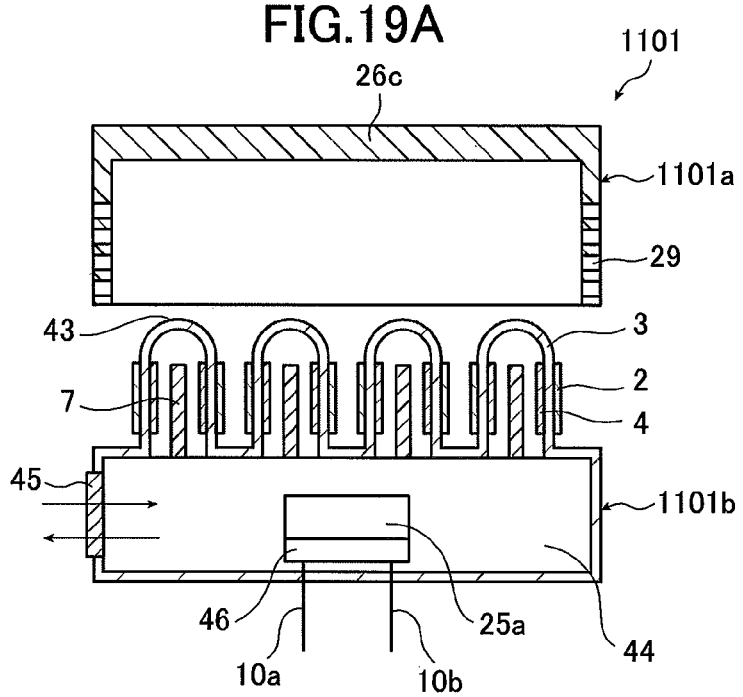
FIGS. 19A and 19B are cross-sectional views of a fuel cell according to a twelfth embodiment of the present invention.

The fuel cell 1101 according to the twelfth embodiment is composed of a thermal insulating unit 1101a and a fuel cell unit 1101b. As shown in FIG. 19, FIGS. 19A and 19B are cross-sectional views of the fuel cell 1101 having plural fuel cell portions, and FIG. 19C is a perspective view thereof. As shown in FIGS. 19A to 19C, the fuel cell includes the thermal insulating unit 1101a and the fuel cell unit 1101b.

The thermal insulating unit 1101a is a box-like member formed of a thermal insulating material 26c. The bottom part thereof is widely opened, and the wall surface portion thereof is provided with plural air holes 29. The fuel cell unit 1101b includes plural fuel cell portions 43, and a sealed space 44 is disposed inside each of the plural fuel cell portions 43. The sealed space 44 is sealed by a sealing portion 45 such that the space can be repeatedly opened and closed. In the sealed space 44, a fuel-heating portion 46 and an anode fuel material 25a heated by the fuel-heating portion 46 are installed.

Figure 19D:
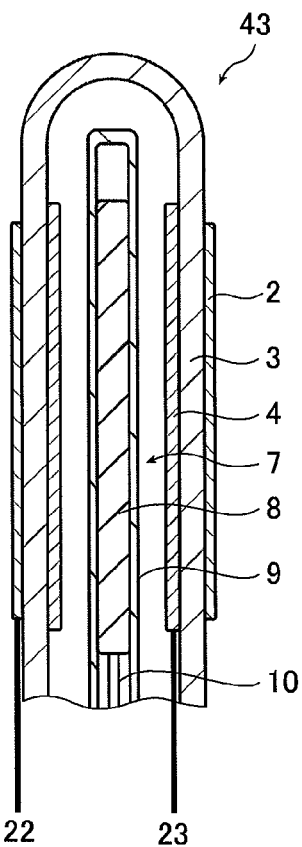
FIG. 19D is an enlarged cross-sectional view of a fuel cell portion thereof.
Figure 19B:
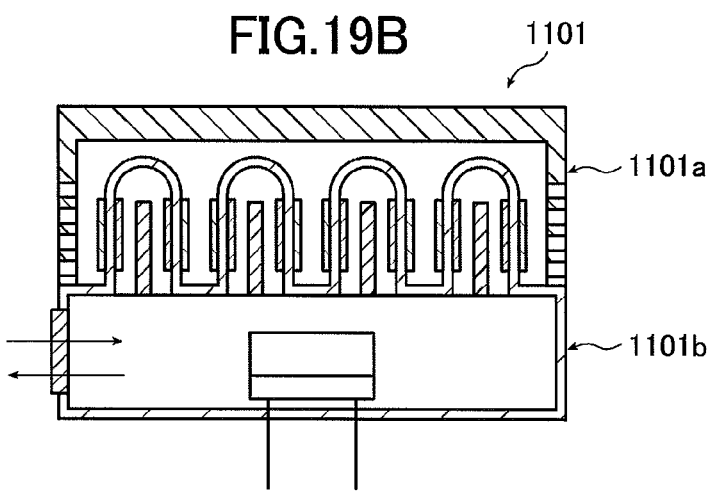
Figure 19C:
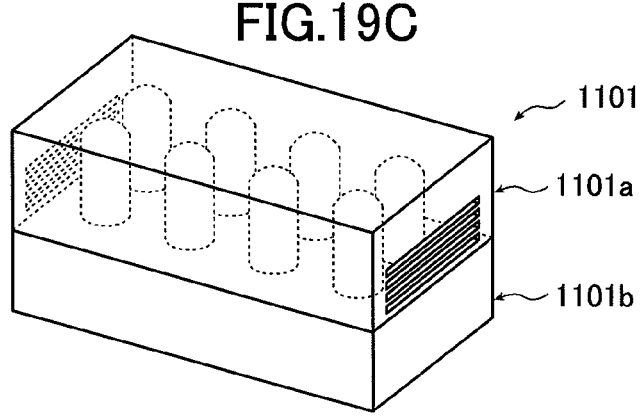
FIG. 19C is a perspective view of the fuel cell.

As shown in FIG. 19D, the fuel cell portion 43 is composed of the cylindrical cathode 2, the solid electrolyte 3 of which one end is blocked, the cylindrical anode 4, and the columnar heating portion 7. The cathode current collector 22 and the anode current collector 23 are connected to the cathode 2 and the anode 4 respectively and are lead out as terminals. Similarly to the first and eleventh embodiments and the like, the columnar heating portion 7 is constituted with the heating element 8 and the heating element case 9 covering the heating element 8, and includes the wirings 10a and 10b for supplying power to the heating element 8. The heating portion 7 is fixed so as to be disposed at the center of the fuel cell portion 43.

Next, the operation of the fuel cell 1101 according to the twelfth embodiment will be described. The power generation reaction occurring in each of the fuel cell portions 43 is the same as the power generation reaction of the eleventh embodiment shown in FIGS. 18A and 18B.

The thermal insulating unit 1101a and the fuel cell unit 1101b are arranged as shown in FIG. 19A and installed as shown in FIG. 19B, whereby each of the fuel cell portions 43 is insulated from the outside air. Oxygen is supplied to the cathode 2 of the fuel cell portion 43 from the air holes 29.

Thereafter, the fuel-heating portion 46 of the fuel cell unit 1101b generates heat by being supplied with power through the wirings 10a and 10b and heats the anode fuel material 25a installed inside the sealed space 44. The organic compound as the anode fuel material 25a is carbonized by being heated together with water and becomes carbon, and the resulting carbon reacts with water (water vapor) to generate hydrogen and carbon monoxide as reducing gas.

The thus generated reducing gas fills up the sealed space 44, and according to the partial pressure thereof, the gas is supplied to each of the plural fuel cell portions 43. That is, the reducing gas is evenly supplied to the inside of each fuel cell portion 43, even if intentional regulation is not performed.

As shown in FIGS. 19B and 19C, when the thermal insulating unit 1101a is installed in the fuel cell unit 1101b, power is supplied to the columnar heating portion 7 through the wiring 10 as shown in FIG. 19D. As a result, heat is generated, and the fuel cell portion 43 is heated.

In the fuel cell portion 43, the reducing gas is oxidized to be oxidation gas as described above, whereby power is generated.

If a gas absorber which is a substance reacting with carbon dioxide as oxidation gas is installed in the sealed space 44 or the fuel cell unit 1101b has a constitution capable of discharging carbon dioxide to the outside, it is possible to generate power for a long time while maintaining the internal pressure of the sealed space 44 within a predetermined range.

The fuel cell unit 1101b can have the sealed space 44 opened by opening the sealing portion 45. At this time, the remnant of the anode fuel material 25a completely reacted can be discharged, and a new anode fuel material 25a can be installed. Accordingly, the fuel cell is repeatedly usable. The anode fuel material 25a may be made into a module by being put into an anode fuel case not shown in the drawing, and may have the shape of a cassette, a bag, or a box.

As the fuel cell 1101, if plural fuel cell portions 43 are connected to each other in series or in parallel, a high-voltage/high-capacity battery can be constituted in a simple manner.

In the first to ninth, eleventh, and twelfth embodiments, gap is formed between the anode 4 and the anode fuel material 5, 25, or 25a. However, as the tenth embodiment, even if the anode 4 is brought into contact (electrical contact) with the anode fuel material 35, the fuel cell can be operated.

Moreover, in the above-mentioned embodiments of the present invention, a fuel cell system may be built by connecting plural fuel cells (fuel cells 1 and 101 to 1101) to one another in series or in parallel. If the fuel cell system constituted by connecting plural fuel cells to one another in series or in parallel is built, a high-voltage/high-capacity battery can be constituted in a simple manner, and it is possible to cope with a system that requires a high voltage and a high current.

EXAMPLES

Example 1

(Preparation of Fuel Cell Portion)

As Example 1, the fuel cell 401 according to the fifth embodiment shown in FIG. 10 was prepared.

As the solid electrolyte 3, an yttria-stabilized zirconia protection tube having an outer diameter of 12.7 mm, an inner diameter of 9.5 mm, and a length of 300 mm was used. As shown in FIG. 10, one end of the yttria-stabilized zirconia protection tube is blocked. In the inside of the protection tube, an area 50 mm distant from the tip of the protective tube was coated with platina ink as the anode 4. Moreover, in the outside of the protection tube, an area 50 mm distant from the tip of the protective tube was coated with lanthanum strontium manganite (LSM) ink as the cathode 2. Thereafter, the cathode 2 and the anode 4 were connected to silver wires 22 and 23 respectively by using silver paste. On the basal portion (an opened portion which is the other end) of the protection tube, a stainless steel ferrule 18 for vacuum equipped with the O-ring 17 (Ultra-Torr manufactured by Swagelok Company) was mounted. A silver wire to be connected to the anode was connected to the inside of the stainless steel ferrule 18 for vacuum equipped with the O-ring 17 by using silver paste to use the ferrule 18 for vacuum as an anode terminal.

(Preparation of Anode Fuel Material)

110 parts by weight of $Fe_2O_3$ powder (manufactured by Sigma-Aldrich Co. LLC.) having a particle size of 50 nm was mixed with 300 parts by weight of ethanol to prepare slurry. The slurry was put into a beaker, and 3.81 parts by weight of tetraethyl orthosilicate (manufactured by Sigma-Aldrich Co. LLC.) was added thereto under stirring of the slurry. The mixture was heated to evaporate ethanol, and the residual powder was baked for 2 hours at 200° C. to obtain $Fe_2O_3$ powder coated with 1% by weight of silicon dioxide, thereby obtaining the anode fuel material 5.

(Preparation of Fuel Cell)

10 mg of the anode fuel material was wrapped in ceramic fiber (anode fuel case 6) and inserted into the yttria-stabilized zirconia protection tube as the solid electrolyte 3. Subsequently, needle valves 19 and 20 (manufactured by Swagelok Company) were mounted on the tip of the stainless steel ferrule 18 for vacuum equipped with the O-ring 17. A vinyl tube was mounted on the tip of the needle valves 19 and 20, and the other end of the vinyl tube was connected to a cylinder containing mixed gas of 5% hydrogen and 95% nitrogen. At this time, a small gap is left between the needle valves 19 and 20 and the vinyl tube to use the gas as a leakage hole of the mixed gas. The area starting from the tip of the yttria-stabilized zirconia protection tube 3 to a portion 100 mm distant from the tip was installed in a tube furnace, and the tube furnace was heated and kept at 850° C. As a result of measuring the temperature of the protection tube 3 by using a thermocouple, the temperature was 850° C. in the tip of the protection tube, 800° C. in a portion 100 mm distant from the tip, 300° C. in a portion 200 mm distant from the tip, and 150° C. in a portion about 300 mm distant from the tip (connection portion of the ferrule 18 for vacuum). The valve of the cylinder containing mixed gas of 5% hydrogen and 95% nitrogen and the needle valves 19 and 20 were opened to supply the mixed gas into the protection tube 3 for 10 hours, and then needle valves 19 and 20 were closed to make the inside of the protection tube 3 into the sealed space 13.

(Charge and Discharge Test)

By being connected to a charge-discharge apparatus, the fuel cell 401 was discharged at a constant current of 2 mA and a cutoff voltage of 0.6 V. The initial capacity of the fuel cell was measured to be 7.78 mAh. Then a charge and discharge test was conducted under the following conditions.

(Charge and Discharge Test)

Charge: a constant current of 4 mA, a cutoff voltage of 1.25 V

Discharge: a constant current of 4 mA, a cutoff voltage of 0.65 V

During the test, at every $21^{st}$ cycle, charge and discharge were performed under the following conditions to evaluate a capacity maintenance rate compared to the initial capacity.

(Test for Measuring Capacity Maintenance Rate)

Charge: a constant current of 2 mA, a cutoff voltage of 1.25 V

Discharge: a constant current of 2 mA, a cutoff voltage of 0.6 V

Figure 20:
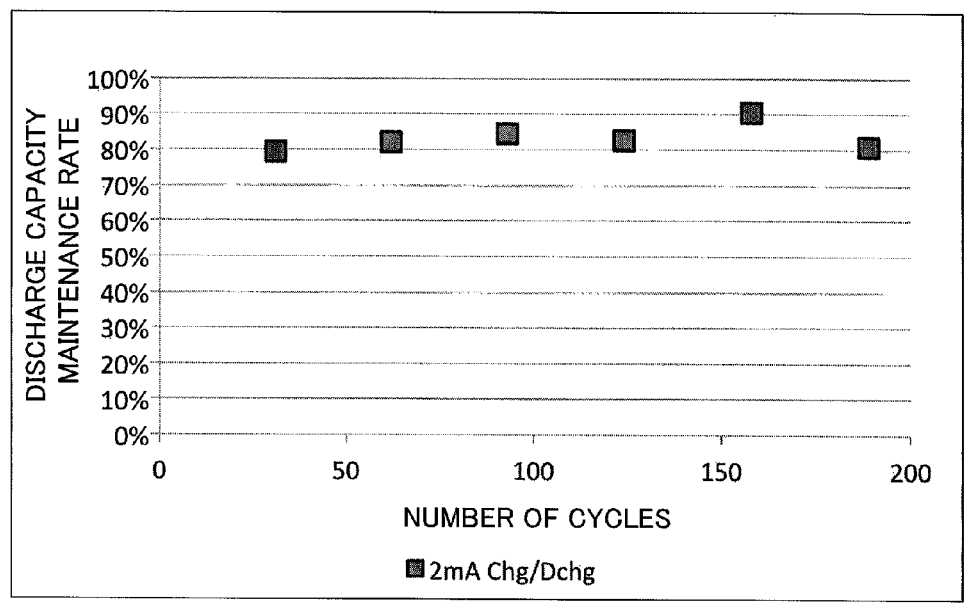
FIG. 20 is a view showing the change in capacity caused by cycling of a fuel cell prepared in Example 1.

FIG. 20 shows the capacity maintenance rate at every $21^{st}$ cycle. Even after the 120 cycles for which about 2 weeks elapsed from the starting of the test, decrease in the capacity was not observed, and charge and discharge could be repeated.

So far, the fuel cell of the present invention has been described in detail based on the first to twelfth embodiments and Example 1, but the present invention is not limited thereto and may be improved or modified in various forms without departing from the gist of the present invention.

What is claimed is:

1. A fuel cell comprising:
    an airtight solid electrolyte that conducts oxygen ions;
    an anode that is formed on one surface of the solid electrolyte and oxidizes reducing gas into oxidation gas when discharging;
    a cathode that is formed on another surface of the solid electrolyte and reduces oxygen into oxygen ions when discharging;
    an anode fuel material that generates the reducing gas and becomes itself an oxide by reacting with the oxidation gas;
    a heating portion for heating and maintaining the solid electrolyte and the anode fuel material at a temperature equal to or higher than a predetermined level; and
    a sealing portion that is installed in the solid electrolyte, forms a sealed space sealing the anode and the anode fuel material together with the solid electrolyte and the heating portion, and can repeatedly open and close,
    wherein a heating element of the heating portion is separated from the sealing potion by a distance L such that the temperature of the sealing portion is configured to be less than 300° C. during an operation of the fuel cell, wherein the temperature of the heating element is configured to heat up to a temperature of 650° C. to 1,000° C. and wherein the fuel cell is configured to be operated at a temperature up to 1000° C.,
    and the fuel cell further comprising a thermal insulating material which covers the solid electrolyte that extends from a lower end of the heating element of the heating portion to the sealing portion.

2. The fuel cell according to claim 1,
    wherein the solid electrolyte is cylindrical,
    the cathode is formed into a cylindrical shape along the outer surface of the cylindrical solid electrolyte,
    the anode is formed into a cylindrical shape along the inner surface of the solid electrolyte,
    the anode fuel material is cylindrical and disposed inside the anode,
    the heating portion is columnar and disposed inside the cylindrical anode fuel material,
    the cylindrical solid electrolyte accommodates inside thereof, the cylindrical anode, the cylindrical anode fuel material, and the columnar heating portion disposed inside the cylindrical anode fuel material, one end of the cylindrical solid electrolyte is blocked, and another end of the cylindrical solid electrolyte is sealed by the sealing portion which is penetrated by the columnar heating portion and is in close contact with the outer surface of the columnar heating portion.

3. The fuel cell according to claim 2,
    wherein the sealing portion includes a sealing stopper that is connected to the one end of the cylindrical solid electrolyte by one of the brazing, laser welding, TIG welding, solder welding, ultrasonic welding, gasket sealing, and O-ring sealing, or by a combination of these.

4. The fuel cell according to claim 1,
    wherein the reducing gas is hydrogen, carbon monoxide, nitrogen monoxide, or a mixed gas of these.

5. The fuel cell according to claim 1,
    wherein the anode reduces the oxidation gas into the reducing gas when charging,
    the cathode oxidizes the oxygen ions into oxygen when charging, and the oxide of the anode fuel material generates the oxidation gas and becomes itself the anode fuel material by reversibly reacting with the reducing gas.

6. The fuel cell according to claim 1,
wherein the anode fuel material is at least one kind of substance selected from a group consisting of lithium, sodium, magnesium, calcium, aluminum, silicon, zinc, iron, lead, tin, nickel, carbon, and a substance containing at least one or more kinds of elements among the above as a main component.

7. The fuel cell according to claim 1,
wherein the solid electrolyte is one of an oxide having a fluorite structure, an oxide having a perovskite structure, and an oxide having an apatite structure, or a combination of these.

8. The fuel cell according to claim 1,
wherein the solid electrolyte is one of yttria-stabilized zirconia, a cerium-gadolinium oxide, a BIMEVOX compound represented by $Bi_2M_xV_{1-x}O_{5.5-3x/2-\delta}$ (M is a transition metal), lanthanum gallate, barium cerate, and $La_{1-x}Sr_xGa_{1-y}Mg_yO_{3-\delta}$, or a combination of these.

9. The fuel cell according to claim 1,
wherein the anode fuel material is a module having a shape of a cassette, a bag, or a box and is detachable, attachable, and replaceable.

10. The fuel cell according to claim 1,
wherein the anode fuel material is not electrically in contact with the anode.

11. The fuel cell according to claim 1,
wherein the anode fuel material is electrically in contact with the anode.

12. The fuel cell according to claim 1,
wherein the sealed space includes a pressure-absorbing portion composed of a bellows and/or a gas absorber for maintaining the internal pressure within a predetermined range.

13. A fuel cell system comprising a plurality of the fuel cells according to claim 1 that are connected to one another in series or in parallel.

14. The fuel cell system according to claim 13, further comprising an anode fuel material used in common.

15. A fuel cell comprising:
a cylindrical solid electrolyte that has ion conductivity and air-tightness and conducts oxygen ions from an outer surface thereof to an inner surface thereof;
a cylindrical cathode that is formed on the outer surface of the solid electrolyte and reduces oxygen into the oxygen ions when discharging;
a cylindrical anode that is formed on the inner surface of the solid electrolyte and oxidizes reducing gas which is used as fuel when discharging into oxidation gas by using the oxygen ions conducted from the outer surface of the solid electrolyte to the inner surface thereof;
a columnar anode fuel material that is disposed inside the anode and reduces the oxidation gas to generate the reducing gas and becomes itself an oxide by reacting with the oxidation gas oxidized by the anode; and
a cylindrical heating portion that is disposed outside the cathode and heats at least the solid electrolyte to maintain a portion of the solid electrolyte at a temperature equal to or higher than a predetermined level,
wherein both ends of the cylindrical solid electrolyte are blocked and a sealed space in which the cylindrical anode and the columnar anode fuel material are sealed is formed inside the cylindrical solid electrolyte,
at least one of the both ends of the cylindrical solid electrolyte is blocked by a sealing portion,
the sealing portion is repeatedly detachable, and
a heating element of the heating portion is separated from the sealing portion by a distance L such that the temperature of the sealing portion is configured to be less than 300° C. during an operation of the fuel cell, wherein the temperature of the heating element is configured to heat up to a temperature of 650° C. to 1,000° C. and wherein the fuel cell is configured to be operated at a temperature up to 1000° C. and the fuel cell further comprising a thermal insulating material which covers the solid electrolyte that extends from a lower end of the heating element of the heating portion to the sealing portion.

16. The fuel cell according to claim 15,
wherein the sealing portion includes a sealing stopper that is connected to the end of the cylindrical solid electrolyte by one of the brazing, laser welding, TIG welding, solder welding, ultrasonic welding, gasket sealing, and O-ring sealing, or by a combination of these.

17. A fuel cell comprising:
a solid electrolyte that has ion conductivity and air-tightness and conducts oxygen ions from a front surface thereof to a rear surface thereof;
a cathode that is formed on the front surface of the solid electrolyte and reduces oxygen into the oxygen ions when discharging;
an anode that is formed on the rear surface of the solid electrolyte and oxidizes reducing gas which is used as fuel when discharging into oxidation gas by using the oxygen ions conducted from the front surface of the solid electrolyte to the rear surface thereof;
an anode fuel material that reduces the oxidation gas to generate the reducing gas and becomes itself an oxide by reacting with the oxidation gas oxidized by the anode;
a heating potion that heats at least the solid electrolyte to maintain a portion of the solid electrolyte at a temperature equal to or higher than a predetermined level; and
at least one sealing portion that forms a sealed space together with the solid electrolyte,
wherein the sealed space accommodates the anode and the anode fuel material,
the at least one sealing portion is repeatedly detachable, and
a heating element of the heating portion is separated from the sealing portion by a predetermined distance L, such that the temperature of the sealing portion is configured to be less than 300° C. during an operation of the fuel cell, wherein the temperature of the heating element is configured to heat up to a temperature of 650° C. to 1,000° C. and wherein the fuel cell is configured to be operated at a temperature up to 1000° C. and the fuel cell further comprising a thermal insulating material which covers the solid electrolyte that extends from a lower end of the heating element of the heating portion to the sealing portion.

18. The fuel cell according to claim 17,
wherein the sealing portion forms the sealed space by one of the brazing, laser welding, TIG welding, solder welding, ultrasonic welding, gasket sealing, and O-ring sealing, or by a combination of these.

* * * * *